(12) United States Patent
Bogle et al.

(10) Patent No.: US 6,353,923 B1
(45) Date of Patent: Mar. 5, 2002

(54) ACTIVE DEBUGGING ENVIRONMENT FOR DEBUGGING MIXED-LANGUAGE SCRIPTING CODE

(75) Inventors: Phillip Lee Bogle, Redmond; Gary S. Katzenberger, Woodinville; Samuel James McKelvie; Robert Victor Welland, both of Seattle, all of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/016,760

(22) Filed: Jan. 30, 1998

Related U.S. Application Data

(63) Continuation-in-part of application No. 08/815,719, filed on Mar. 12, 1997.

(51) Int. Cl.$^7$ ................................................. G06F 9/45
(52) U.S. Cl. ......................................................... 717/4
(58) Field of Search ................................. 395/704, 705; 717/4, 5, 6, 1, 2; 714/34, 38; 703/23, 26, 27

(56) References Cited

U.S. PATENT DOCUMENTS

| | | | |
|---|---|---|---|
| 5,048,018 A | * 9/1991 | Bernstein et al. | 395/704 |
| 5,432,940 A | 7/1995 | Potts et al. | |
| 5,475,843 A | 12/1995 | Halviatti et al. | |
| 5,615,332 A | * 3/1997 | Yamamoto | 714/38 |
| 5,669,000 A | * 9/1997 | Jessen et al. | 395/704 |
| 5,768,510 A | 6/1998 | Gish | |
| 5,771,385 A | * 6/1998 | Harper | 395/704 |
| 5,815,653 A | * 9/1998 | You et al. | 714/38 |
| 5,819,093 A | * 10/1998 | Davidson et al. | 395/704 |
| 5,854,930 A | * 12/1998 | McLain, Jr. et al. | 395/705 |
| 6,011,920 A | 1/2000 | Edwards et al. | |

OTHER PUBLICATIONS

Box, D., "Say Goodbye to Macro Envy With Active Scripting," *Microsoft Interactive Developer*, 7pp. (Feb. 1997).
Pleas, K., "Visual Basic Script," *Microsoft Interactive Developer*, pp. 55–63 (Spring 1996).
Brockschmidt, K., "OLE Automation and Automation Objects," *Inside OLE*, Second Ed., Chapter 14, pp. 635–730 (1995).
Brockschmidt, K., "OLE Automation Controllers and Tools," *Inside OLE*, Second Ed., Chapter 15, pp. 731–760 (1995).
Microsoft Corporation, "Working With Batch Programs," *MS DOS 5.0 User's Guide & Reference*, Chapter 10, pp. 225–244 (1991).
Wall, L. et al., "An Overview of Perl," *Programming Perl*, Chapter 1, pp. 1–34 (1996).

(List continued on next page.)

*Primary Examiner*—Kakali Chaki
(74) *Attorney, Agent, or Firm*—Klarquist Sparkman Campbell Leigh & Whinston, LLP

(57) ABSTRACT

An active debugging environment for debugging a virtual application that contains program language code from multiple compiled and/or interpreted programming languages. The active debugging environment is language neutral and host neutral, where the host is a standard content centric script host with language engines for each of the multiple compiled and/or interpreted programming languages represented in the virtual application. The active debugging environment user interface can be of any debug tool interface design. The language neutral and host neutral active debugging environment is facilitated by a process debug manager that catalogs and manages application specific components, and a machine debug manager that catalogs and manages the various applications that comprise a virtual application being run by the script host. The process debug manager and the machine debug manager act as an interface between the language engine specific programming language details and the debug user interface.

20 Claims, 6 Drawing Sheets

OTHER PUBLICATIONS

Wall, L. et al., "Other Oddments," *Programming Perl*, Chapter 8, pp. 517–527 (1996).

Dilascia and Stone, "Sweeper," *Microsoft Interactive Developer*, vol. 1, No. 1 pp. 16–52 (1996).

"ActiveX Scripting," distributed as part of a CD–ROM at a developers conference, 38 pp. (Mar. 12, 1996).

Walsh, A., *Foundations of Java Programming for the World Wide Web*, IDG Books Worldwide, Inc., pp. 171–191, 311–328 (1996).

Thomas et al., *Visual Basic 4 How–To*, The Waite Groupe, pp. 315–316, 1011–1039 (1995).

Perry et al., "Debugging Visual C + + Applications," *Using Visual C + + 2 Special Edition*, Chapter 4, Que Corporation, pp. 123–152 (1994).

Perry et al., "Advanced Debugging Techniques," *Using Visual C + + 2 Special Edition*, Chapter 19, Que Corporation, pp. 823–854 (1994).

Schmidt, "Investigating Multilanguage Debugging and the New IDEs of Visual Studio 97," Microsoft Systems Journal, pp. 1–18 (1997).

Rahmel, D., "Comparing JavaScript and VBScript," *DBMS*, 9 pp. (Oct. 1996).

Kaufman et al., "Teach Yourself ActiveX Programming in 21 Days," Sams.net Publishing, 20 pp. (Nov. 16, 1996).

Apple Computer, Inc., "Inside MacIntosh—Interapplication Communication," pp. iii–xxvii, 1–3—1–22, 7–1—7–28, 8–1—8–46, 10–1—10–125 (1993).

Ranganthan et al, "A mobile debugger for modile programs", IEEE, pp 159, 1998.*

Lourenco et al, A PDBG process level debugger for parallel and distributed programs, IEEE, pp 154, 1998.*

* cited by examiner

ACTIVE DEBUGGING ENVIRONMENT FOR DEBUGGING MIXED-LANGUAGE SCRIPTING CODE

This is Application is a Continuation-in-Part of Application Ser. No. 08/815,719 filed Mar. 12, 1997, the text of which is incorporated by reference to the same extent as if the text where present herein.

COPYRIGHT AUTHORIZATION

A portion of the disclosure within this document contains material that is subject to copyright protection. The copyright owner has no objection to the reproduction of copyright protected materials by any person that is doing so within the context of this patent document as it appears in the United States Patent and Trademark Office patent file or records, but the copyright owner otherwise reserves all copyright rights whatsoever.

FIELD OF THE INVENTION

This invention relates to programming language debugging tools, and in particular, to an active debugging environment that is programming language neutral and host neutral for use in debugging any of a variety of disparate compiled and/or interpreted programming languages that may exist individually or in combination within a given application.

PROBLEM

The end user of a modern software product sees and uses an application that was created by an application developer. For purposes of this discussion, an application is a computer program written in any of a plurality of programming languages. Typically, a computer program contains some original program code and certain pre-existing or "canned" components that include, but are not limited to, modules, libraries, sub-routines, and function calls. The pre-existing application components are used where ever possible to limit the number of mistakes that are introduced into the application during development, and to minimize the amount of overall effort required to create the application.

As the number of applications and their components have increased, and the number of different programming languages used to generate the applications have increased, so also has the need grown for applications to expose their internal services to other applications in a consistent manner independent of the underlying programming languages involved. This need for exposing internal services of various applications in a universal manner is referred to as providing programmability.

Existing program architectural models such as the Component Object Model (COM) have greatly contributed to programmability across different applications. The COM model establishes a common paradigm for interactions and requests among different applications regardless of the programming languages or components involved. With COM, for example, an Internet web page application can be created that calls on only certain of the components of a word processing application, a spread sheet application, and a database application, that are needed to complete the web page application without including the entire bulk of each of the word processing, spread sheet, and database features within the web page application.

However, one problem that results from creating an application that includes multiple program components from many different programming language sources, is debugging. A first and third program component in an application may have originated from two different compiled language sources and a second and fourth program component in an application may have originated from two different interpretive language sources. Not only is there historically a fundamental difference in the implementation of a debugger for a compiled programming language versus an interpreted programming language, each programming language can have its own proprietary interfaces and other features that make debugging the aggregate application a difficult and/or impossible task.

For purposes of this document, a compiled programming language is considered a native machine code compilable programming language having a specific target platform. Examples of compiled programming languages include, but are not limited to, C and C++. Alternatively, an interpreted programming language is a run-time bytecode interpreted or source code interpreted programming language that operates under control of a master within a given application. Examples of interpreted programming languages include Visual Basic, Visual Basic for Applications (VBA), Visual Basic Script, Java, JavaScript, Perl, and Python. The Java programming language is included in the category of interpreted programming languages for purposes of this document even though Java is compiled from source code to produce an object and there is no access to the Java source during run time. One key reason Java is included is because the compiled Java object is fundamentally a bytecode object that requires a language engine rather than the traditional machine code link, load, and execute steps.

One example of a compiled programming language debugger limitation is that they require knowledge of the static environment from which the run-time object code was generated. The static environment of a compiled programming language includes the source code and the corresponding object code. A debugger for a compiled programming language performs the work of generating a mapping of the structures between the source code and the object code prior to executing the object being debugged, and the debugger requires that the source code and object code remain consistent throughout the debug process. Any changes to either the source code and/or the object code render the debug mapping and subsequent debugging capability unsound. For this reason, compiled programming language debuggers do not tolerate run time changes to code and the debugger for one compiled programming language is not functional for any other programming language.

Alternatively, interpreted programming languages are more flexible in that they are run-time interpreted by a programming language engine that does not require a static source code or object code environment. However, interpreted programming language debuggers do not accommodate compiled programming language debugging and are often functional with only one interpreted programming language.

Another problem with compiled programming language debuggers is that they only function under known predefined run-time conditions with a specific operating environment. However, even under these constraints existing compiled programming language debuggers are only aware of predefined host application content that is made available to the debugger prior to run time, but the debuggers have no run-time knowledge of host application content.

One solution to the difficulty with debugging applications that contain disparate code from compiled programming languages and/or interpreted programming languages is to limit the developer to using only one programming language for an application. However, this solution is undesirable because no one programming language is ideal for every application. Further, this solution is unreasonable because the demands of present day Internet web page programming, as well as the general customer/developer demands in the computing industry, require multi-language extensibility.

For these reasons, there exists an ongoing need for a debugging technology that facilitate efficient programmability by way of programming language, host application, and operating environment independence. A system of this type has heretofore not been known prior to the invention as disclosed below.

SOLUTION

The above identified problems are solved and an advancement achieved in the field of programming language debuggers due to the active debugging environment of the present invention for applications containing compiled and interpreted programming language code. The active debugging environment facilitates content rich run-time debugging in an active debug environment even if a mixture of compiled and interpreted programming languages exist within the application being debugged. One purpose of the active debugging environment is to provide an open and efficiently deployed framework for authoring and debugging language neutral and host neutral applications.

In the context of the present discussion, language neutral means that a debugging environment exists that transparently supports multi-language program debugging and cross-language stepping and breakpoints without requiring specific knowledge of any one programming language within the environment. Host neutral, also referred to as content-centric, means that the debugging environment can be automatically used with any active scripting host such that the host application has control over the structure of the document tree presented to the debug user, including the contents and syntax of coloring of the documents being debugged. In addition, the debugging environment provides debugging services that include, but are mot limited to, concurrent host object model browsing beyond the immediate run-time scope. Host document control allows the host to present the source code being debugged in the context of the host document from which it originated. Further, the language neutral and content-centric host neutrality, facilitates a developer transparent debugging environment having multi-language extensibility, smart host document and application context management, and virtual application discoverability and dynamicness.

Discoverability means the ability for the debugging environment to be started during program run-time and immediately step into a running application with full knowledge of the executing program's context and program execution location. Dynamicness means the concept of flexible debugging where there is no static relationship between the run-time environment at the beginning of program execution and the run-time environment at some later point in program execution. In other words, script text can dynamically be added to or removed from a running script with the debugging environment having immediate and full knowledge of the changes in real time.

Key components of the active debugging environment include, but are not limited to, a Process Debug Manager (PDM) that maintains a catalog of components within a given application, and a Machine Debug Manager (MDM) that maintains a catalog of applications within a virtual application. The active debugging environment components work cooperatively with any replaceable and/or generic debug user interface that support typical debugging environment features. The active debugging environment also cooperatively interacts with a typical active scripting application components that include, but are not limited to, at least one language engine for each programming language present in a given script, and a scripting host.

The method for debugging a multiple language application in an active debugging environment includes, but is not limited to, defining a content centric host, defining a language neutral debugging environment, generating a virtual application that includes the multiple compiled and interpretive programming language statements and related programming language context, and executing the virtual application on the content centric host under control of the language neutral active debugging environment.

Defining a content centric host includes establishing a language engine component for each unique programming language associated with the multiple compiled and/or interpreted programming language statements. In addition, the language engine component includes programming language specific mapping and debugging features. Defining the content centric host further includes coordinating in-process activities of the content centric host with each of the language engine component and the language neutral debugging environment. Defining an active debugging environment includes establishing a PDM and an MDM as the core components to facilitate debugging by way of a variety of existing language engines and debug user interfaces, and to coordinate language neutral and host neutral communications between the active debugging environment and the content centric host during debug operations.

Additional details of the present invention will be come apparent and are disclosed in the text accompanying FIGS. 1–7 as set forth below. Appendix A is included to disclose specific details of active scripting interfaces used in one example of a run-time implementation. Appendix B is included to disclose specific details of interfaces used in one example of an active debugging environment implementation.

DETAILED DESCRIPTION

Figure 1:
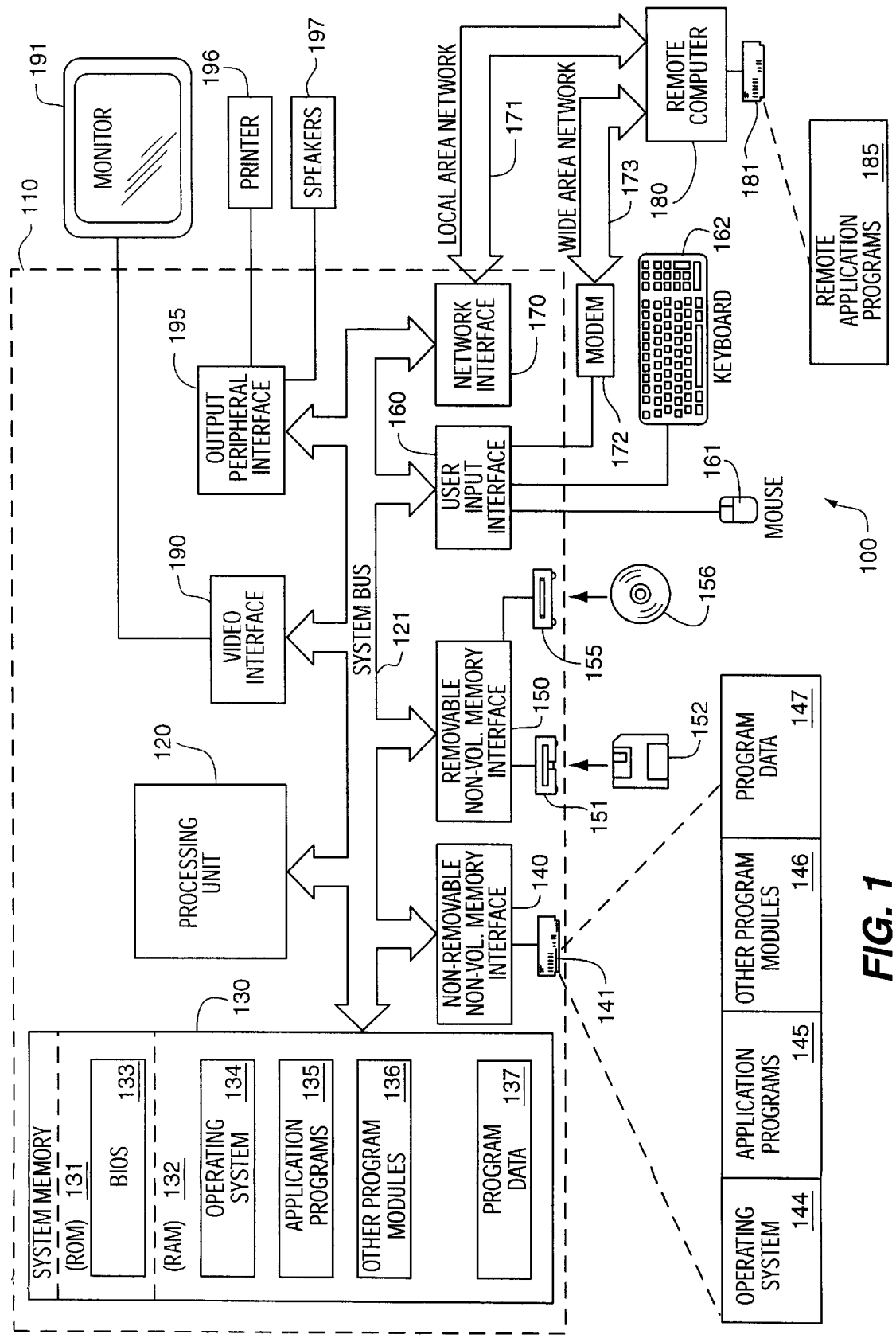
FIG. 1 illustrates an example of a computing system environment example in block diagram form on which the claimed invention can be implemented.

Computing System Environment—FIG. 1

FIG. 1 illustrates an example of a computing system environment 100 on which the claimed invention could be implemented. The computing system environment 100 is only one example of a suitable computing environment for the claimed invention and is not intended to suggest any limitation as to the scope of use or functionality of the claimed invention. Neither should the computing environment 100 be interpreted as having any dependency or requirement relating to any one or combination of components illustrated in the exemplary computing system environment 100.

The claimed invention is operational with numerous other general purpose or special purpose computing system environments or configurations. Examples of well known computing systems, environments, and/or configurations that may be suitable for use with the claimed invention can include, but are also not limited to, a general purpose Personal Computer (PC), hand-held or lap top computers, multi-processor systems, microprocessor-based systems, programmable consumer electronics, network computers, Personal Communication Systems (PCS), Personal Digital Assistants (PDA), minicomputers, mainframe computers, distributed computing environments that include any one or more of the above computing systems or devices, and the like.

The claimed invention may also be described in the general context of computer-executable instructions that are executable on a PC. Such executable instructions include the instructions within program modules that are executed on a PC for example. Generally, program modules include, but are not limited to, routines, programs, objects, components, data structures, and the like that perform discrete tasks or implement abstract data types. The claimed invention may also be practiced in distributed computing environments where tasks are performed by remote processing devices that are linked through a communications network. In a distributed computing environment, program modules may be located in both local and remote memory devices.

The exemplary computing system environment 100 is a general purpose computing device such a PC 110. Components of PC 110 include, but are not limited to, a processing unit 120, a system memory 130, and a system bus 121.

The system bus 121 communicatively connects the aforementioned components and numerous other cooperatively interactive components.

Processing unit 120 is the primary intelligence and controller for PC 110 and can be any one of many commercially available processors available in the industry. System bus 121 may be any combination of several types of bus structures including, but not limited to, a memory bus, a memory controller bus, a peripheral bus, and/or a local bus. System bus 121, also referred to as an expansion bus or I/O channel, can be based on any one of a variety of bus architectures including, but not limited to, Industry Standard Architecture (ISA) bus, Micro Channel Architecture (MCA), Enhanced ISA (EISA), Video Electronics Standards Association (VESA) local bus, and Peripheral Component Interconnect (PCI) also known as Mezzanine bus.

System memory 130 is a volatile memory that can include a Read Only Memory (ROM) 131 and/or a Random Access Memory (RAM) 132. ROM 131 typically includes a Basic Input/Output System (BIOS) 133. BIOS 133 is comprised of basic routines that control the transfer of data and programs between peripheral non-volatile memories that are accessible to PC 110 during start-up or boot operations. RAM 132 typically contains data and/or programs that are immediately accessible to and/or presently being operated on by processing unit 120. Types of data and/or programs in RAM 132 can include operating system programs 134, application programs 135, other program modules 136, and program data 137.

Other components in PC 110 include numerous peripheral devices that are accessible to processing unit 120 by way of system bus 121. The numerous peripheral devices are supported by appropriate interfaces that can include a first non-volatile memory interface 140 for non-removable non-volatile memory device support, a second non-volatile memory interface 150 for removable non-volatile memory device support, a user input interface 160 for serial device support, a network interface 170 for remote device communication device support, a video interface 190 for video input/output device support, and an output peripheral interface 195 for output device support.

Examples of a non-removable non-volatile memory device can include a magnetic disk device 141 or other large capacity read/write medium such as an optical disk, magnetic tape, optical tape, or solid state memory. Types of data often stored on a non-removable non-volatile memory device include persistent copies of programs and/or data being used and/or manipulated in RAM 132 such as operating system programs 144, application programs 145, other program modules 146, and program data 147.

One example of a removable non-volatile memory device can include a magnetic floppy disk device or hard disk device 151 that accepts removable magnetic media 152. Another example of a removable non-volatile memory device can include an optical disk device 155 that accepts removable optical media 156. Other types of removable media can include, but are not limited to, magnetic tape cassettes, flash memory cards, digital video disks, digital video tape, Bernoulli cartridge, solid state RAM, solid state ROM, and the like.

User input interface 160 supports user input devices that can include, but are not limited to, a pointing device 161 commonly referred to as a mouse or touch pad, and a keyboard 162. Other user input devices can include, but are not limited to, a microphone, joystick, game pad, neurostimulated sensor, and scanner, and may require other interface and bus structures such as a parallel port, game port or a Universal Serial Bus (USB) for example.

User input/output devices supported by video interface 190 can include a display monitor 191 or a video camera. Output peripheral interface 195 supports output devices such as printer 196 and speakers 197.

Network interface 170 supports communications access to a remote computing facility such as remote computer 180 by way of Local Area Network (LAN) 171 and/or Wide Area Network (WAN) 173, or other Intranet or Internet connection. Other remote computing facility types for remote computer 180 can include, but are not limited to, a PC, server, router, printer, network PC, a peer device, or other common network node. A remote computer 180 can typically include many or all of the components described above for PC 110. Modulator/Demodulator (MODEM) 172 can also be used to facilitate communications to remote computer 180. Types of programs and/or data accessible from remote memory device 181 on remote computer 180 can include, but are not limited to, remote application programs 185.

Definitions

The following terms and concepts are relevant to this disclosure and are defined below for clarity.

| Term | Definition |
|---|---|
| Code Context | A representation of a particular location in running code of a language engine, such as a virtual instruction pointer. |
| Code object | An instance created by a script host that is associated with a named item, such as the module behind a form in Visual Basic, or a C++ class associated with a named item. |
| Context | An abstraction also referred to as document context that represents a specific range in the source code of a host document. |
| Debug Event | A run-time flow altering condition, such as a breakpoint, that is set in a virtual application by a debugging environment user and managed by the active debugging environment that controls the running of the virtual application. Debug events are defined by the active debugger. |
| Debugger IDE | A replaceable component of the active debugging environment that supports an Integrated Development Environment (IDE) debugging User Interface (UI), and the primary component that communicates with the host application and one or more of the language engines. |
| Expression Context | A context of a resource, such as a stack frame, in which expressions may be evaluated by a language engine. |
| Host Application | The application or process that hosts one or more language engines and provides a scriptable set of objects, also known as an object model. |
| Language Engine | A replaceable component of the active debugging environment, sometimes referred to as a scripting engine, that provides parsing, executing, and debugging abstractions for a particular language, and implements IactiveScript and/or IactiveScriptParse. |
| Machine Debug Manager | A key component of the active debugging environment that maintains a registry of debuggable application processes. |
| Named item | An object, such as one that supports OLE Automation, that the host application deems interesting to a script. Examples include the HTML Document object in a Web browser or the Selection object in Microsoft Word. |
| Object Browsing | A structured, language-independent representation of an object name, type, value, and/or sub-object that is suitable for implementing a watch window user interface. |
| Process Debug Manager | A key component of the active debugging environment that maintains a registry of components for a given application that include the tree of debuggable documents, language engines, running threads, and other application resources. |
| Script | A set of instructions that are run by a language engine. A script can include, but is not limited to any executable code, piece of text, a block of pcode, and/or machine-specific executable byte codes. A script is loaded into a language engine by a script host by way of one of the Ipersist* interfaces or the IactiveScriptParse interface. |
| Script language | An interpreted programming language and the language semantics used to write a script. |
| Script host | An application or program that owns the ActiveScripting engine. The scripting host implements IactiveScriptSite and optionally IactiveScriptSiteWindow. |
| Scriptlet | A portion of a script that is attached to an object event through IactiveScriptParse. An aggregate of scriptlets is a script. |

Figure 2:
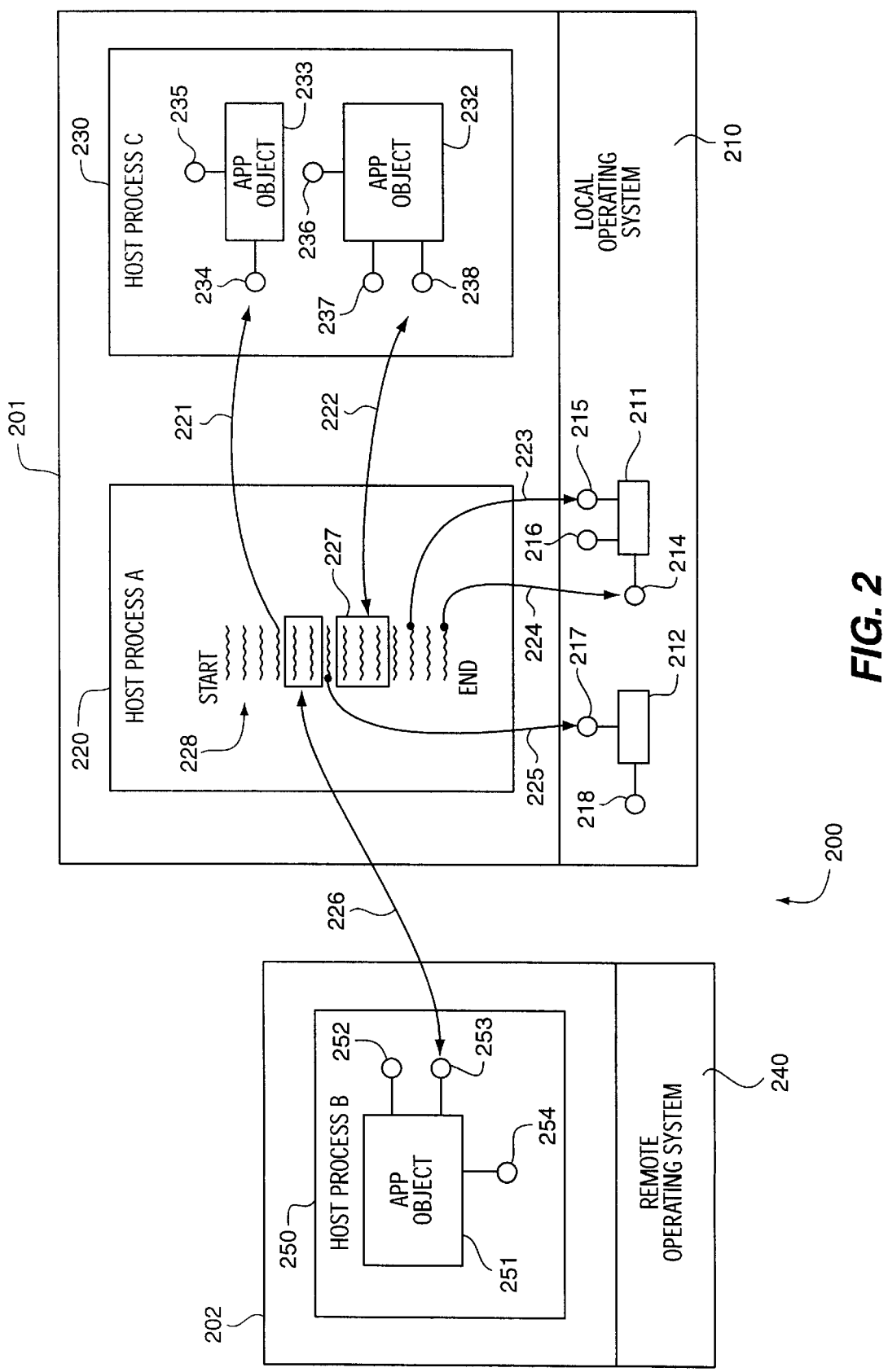
FIG. 2 illustrates a standard object interface example in block diagram form.

Standard Object Interface Example—FIG. 2

FIG. 2 illustrates a standard object interface example 200 in block diagram form. The standard object interface example 200 includes a local computing device 201 and a remote computing device 202, both of which can be personal computers. The remote computing device 202 includes a remote operating system 240 and a host process 250. The host process 250 includes at least one application object 251 having multiple interfaces including but not limited to interfaces 252–254. Each interface 252–254 is a standard COM interface that each exposes at least one method.

The local computing device 201 includes a local operating system 210, a first host process 220 and a second host process 230. The local operating system 210 includes a plurality of application objects 211–212 each having at least one of a plurality of interfaces 214–218. The second host process 230 includes a plurality of application objects including 232–233 each having at least one the plurality of interfaces 234–238. The first host process 220 includes, but is not limited to, a plurality of local and/or remote interface calls 221–226 to respective interfaces in host processes 250, 230, and local operating system 210 as indicated by the directional arrows away from the first host process 220. The interface calls 221–226 occur at various points in a script 228 and two of the calls 222 and 226 result in the downloading of a small section of a foreign program into the script 228 for execution. The downloaded programs may have originated in any compiled or interpreted programming language other than the programming language of script 228. Key to each of the above referenced interface calls is that they are calls to common interfaces that are made in a common manner from any application or process. Scripting Architecture Overview and Operational Example—FIG. 3 A scripting language engine interface provides the capability to add scripting and OLE Automation capabilities to programs such as applications or servers. One example of a scripting language engine interface is embodied in the commercially available product known as ActiveXTM Scripting by Microsoft. ActiveX Scripting enables host computers to call upon disparate language engines from multiple sources and vendors to perform scripting between software components. The implementation of a script itself including the language, syntax, persistent format, execution model, and the like, is left to the script vendor. Care has been taken to allow host computers that rely on ActiveX Scripting to use arbitrary language back-ends where necessary.

Scripting components fall into at least two categories that include script hosts and language engines. A script host creates an instance of a language engine and calls on the language engine to run at least one portion of a script. Examples of script hosts can include but are not limited to Internet and Intranet browsers, Internet and Intranet authoring tools, servers, office applications, and computer games. A desirable scripting design isolates and accesses only the interface elements required by an authoring environment so that non-authoring host computers such as browsers and viewers, and the associated language engines can be kept relatively compact.

Figure 3:
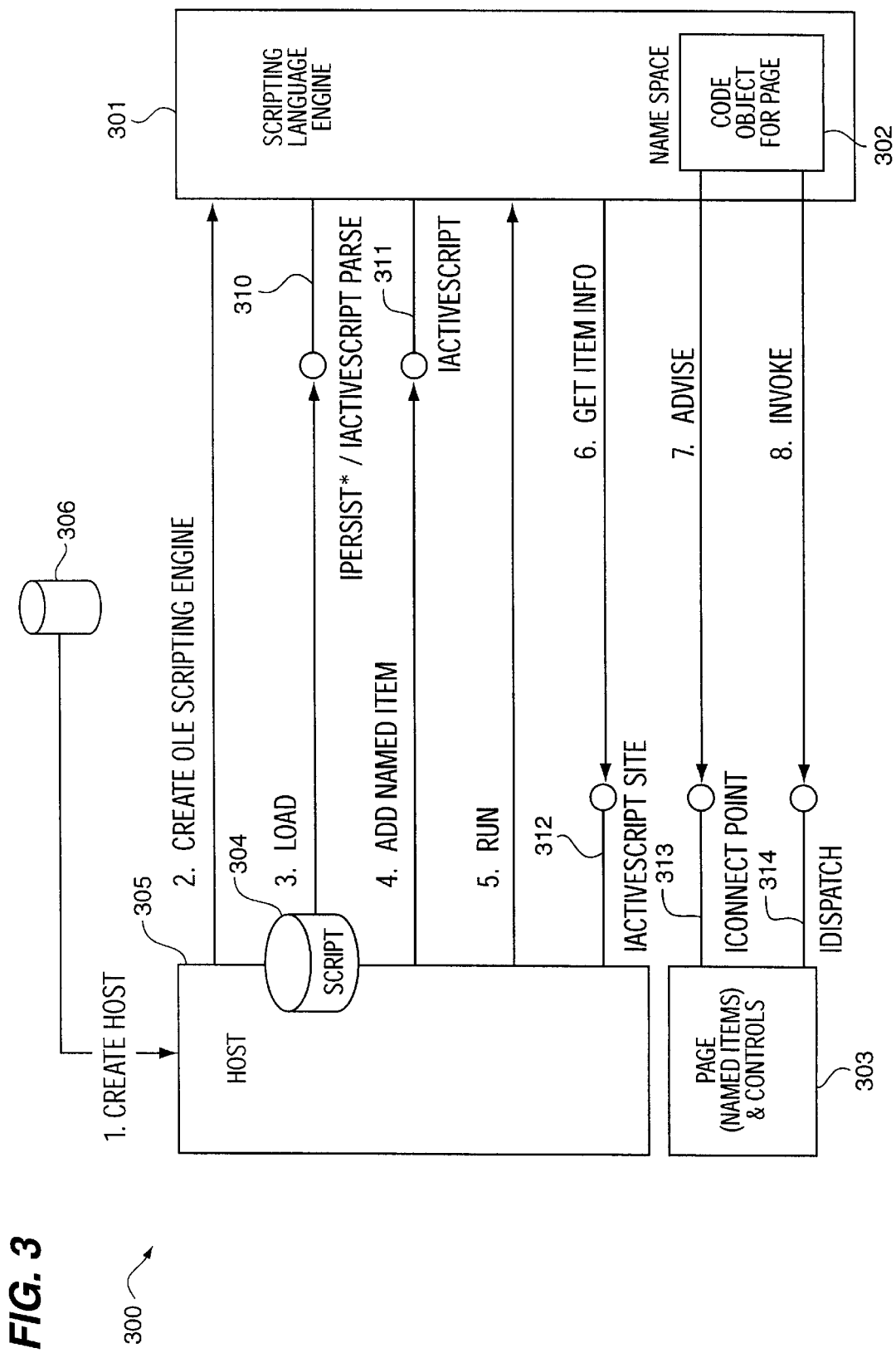
FIG. 3 illustrates a scripting architecture overview and operational example in block diagram form.

FIG. 3 illustrates an operational active scripting architecture example 300 in flow diagram form. Examples of active scripting interfaces are disclosed in Appendix A. Components of the operational active scripting architecture example 300 include a language engine 301, a host document or application 305, a script 304, and various object interfaces 310–314 for the language engine 301 and host application 305 respectively. The following discussion illustrates the interactions between the language engine 301 and the host application 305.

First, a host application 305 begins operations by creating an instance of the application in a workspace of a computing device. A copy of the host application 305 can be obtained from a storage device 306 or other source in any manner well known in the art.

Second, the host application 305 creates an instance of the language engine 301 by calling the function CoCreateInstance and specifying the class identifier (CLSID) of the desired language engine 301. For example, the Hyper Text Markup Language (HTML) browsing component of Internet Explorer receives the language engine's class identifier through the CLSID=attribute of the HTML <OBJECT> tag. The host application 305 can create multiple instances of language engine 301 for use by various applications as needed. The process of initiating a new language engine is well known in the art.

Third, after the language engine 301 is created, the host application 305 loads the script 304 itself into the language engine 301 by way of interface/method 310. If the script 304 is persistent, the script 304 is loaded by calling the IPersist*::Load method 310 of the language engine 301 to feed it the script storage, stream, or property bag that is resident on the host application 305.

Loading the script 304 exposes the host application's object model to the language engine 301. Alternatively, if the script 304 is not persistent then the host application 305 uses IPersist*::InitNew or IActiveScriptParse::InitNew to create a null script. As a further alternative, a host application 305 that maintains a script 304 as text can use IActiveScript-Parse::ParseScriptText to feed the language engine 301 the text of script 304 after independently calling the function InitNew.

Fourth, for each top-level named item 303 such as pages and/or forms of a document that are imported into the name space 302 of the language engine 301, the host application 305 calls IActiveScript::AddNamedItem interface/method 311 to create an entry in the name space 302. This step is not necessary if top-level named items 303 are already part of the persistent state of the previously loaded script 304. A host application 305 does not use AddNamedItem to add sublevel named items such as controls on an HTML page. Instead, the language engine 301 indirectly obtains sublevel items from top-level items by using the ITypeInfo and/or IDispatch interface/method 314 of the host application 305.

Fifth, the host application 305 causes the language engine 301 to start running the script 304 by passing the SCRIPTSTATE_CONNECTED value to the IActive-Script:: SetScriptState interface/method 311. This call typically executes any language engine construction work, including static bindings, hooking up to events, and code execution similar to a scripted "main()" function.

Sixth, each time the language engine 301 needs to associate a symbol with a top-level named item 303, the language engine 301 calls the IActiveScriptSite::GetItemInfo interface/method 312. The, the IActiveScriptSite::GetItem-Info interface/method 312 can also return information about the named item in question.

Seventh, prior to starting the script 304 itself, the language engine 301 connects to the events of all relevant objects through the IConnectionPoint interface/method 313. For example, the IConnectionPoint::Advise(pHandler) message provides the language engine 301 with a request for notification of any events that occur in the host application 305. The IConnectionPoint::Advise message passes an object pHandler that can be called when an event occurs in the host application 305. Once an event occurs in the host application 305, the host application 305 transmits a message to the language engine 301 pdispHandler::Invoke (dispid) as notice that an event occurred in the host application 305. If the event that occurred matches an event that is being monitored by the language engine 301, the language engine 301 can activate a predetermined response.

Finally, as the script 304 runs, the language engine 301 realizes references to methods and properties on named objects through the IDispatch::Invoke interface/method 314 or other standard COM binding mechanisms. Additional implementation specific details of ActiveX Scripting interfaces and methods are disclosed Appendix A.

One purpose of ActiveX is to allow a developer to expose internal objects and/or properties of an application as interfaces and methods available to other applications. A method is an action which the object can perform, and a property is an attribute of the object similar to a variable. The ActiveX interfaces include IDispatch which is an interface to manipulate ActiveX objects. This process is used to get a property, set a property, or call a method. The process uses a late binding mechanism that enables a simple non-compiled interpretive language. Type information in ActiveX includes ITypeInfo which is used for describing an object. A collection of these TypeInfos constitutes a type library, which usually exists on a disk in the form of a data file. The data file can be accessed through ITypeLib and is typically created using MKTypLib. In ActiveX scripting, the type information is provided by scripting hosts and objects that are used by the scripting hosts.

Figure 4:
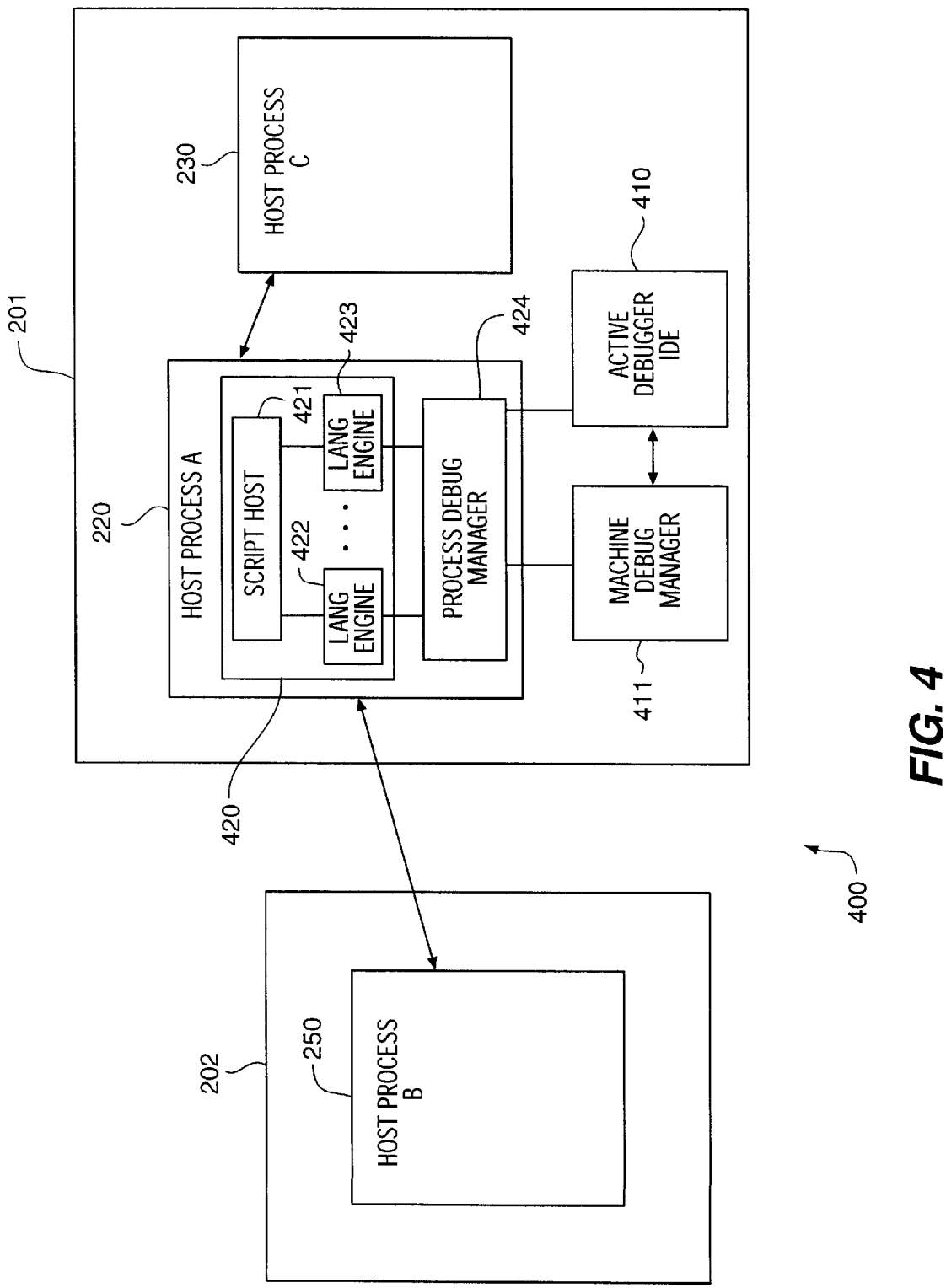
FIG. 4 illustrates an active debugging environment example in block diagram form.

Active Debugging Environment—FIG. 4

FIG. 4 illustrates an example of an active debugging environment 400 in block diagram form based on the standard object interface example 200 of FIG. 2. In the active debugging environment 400 example, the first host process 220 contains the application 421 that is the debugging target although any application in one of the host processes 220, 230, or 250 can be the debugging target if desired. For example, the host process 250 might include an Internet web page application on an Internet server 202, and the host process 220 might include an Internet browser application under development on an end user's local machine 201. The Internet browser application under development would be the debugging target so that the application developer can watch what is happening as the browser interacts with the remote web page and exercises various features and controls of the web page.

Components of the overall active debugging environment 400 include active scripting application components 420, key debugging environment interface components that include the PDM 424 and the MDM 411, and the IDE 410 debug interface. It is important to note that the active scripting application components 420 are standard application components of a product, such as an Internet browser, that are shipped to and used by an end user upon general release of a version of the product. That the standard application components are designed with active debugging environment interfaces in mind is transparent to the end user of the application. Note also that the IDE 410 is an active debugging component that is replaceable by any developer wishing to architect a debugging interface. The PDM 424 and MDM 411 are the fundamental components of the active debugging environment 400 with which the active scripting application components 420 and the IDE 410 must interact to facilitate a functional debugging environment.

The IDE 410 is a debug user interface between the debug user and the active debugging environment 400. The typical IDE 410 allows a debug user to engage in real time document and/or application editing, requesting various views of the running application, defining breakpoints and other execution control management features, requesting expression evaluation and watch windows, and browsing stack frames, objects, classes, and application source code.

One example of debug interfaces for an IDE 410 are disclosed in Appendix B. The architecture of an IDE 410 can be designed to support features such as CModule, CBreakpoint, CApplicationDebugger, and CurStmt. For example, there can be one CModule instance per document/application being debugged such that the instance is maintained in a doubly-linked list headed by g__pModuleHead. Entries in the list can be displayed to the debug user in a selectable Module menu and any selected list item would result in document text being displayed in the richedit control. From the richedit control, the debug user could define set breakpoints or user other viewing features. If a debug user were to set a breakpoint, one Cbreakpoint instance would be generated and maintained in a doubly-linked list headed by the g__pBpHead field of the associated CModule. Each breakpoint position could be represented to the debug user as a text range of the document. One CApplicationDebugger instance would be generated and maintained by the application that implements the IApplicationDebugger interface so that the CApplicationDebugger could respond to all debug events that occur.

Finally, the CurStmt could hold the location of the current statement being executed in addition to referencing the thread associated with the present breakpoint.

The Machine Debug Manager (MDM) 411 maintains a list of active virtual applications and is a central interface between the IDE 410 and the active script components 420. Virtual applications are collections of related documents and code in a single debuggable entity such that separate application components in a continuous line of code can share a common process and/or thread. A virtual application is the aggregate of multiple applications in multiple programming languages. One key role of the machine debug manager is to act as a program language registry that provides a mapping between a given application in the virtual application aggregate and the active debugger IDE 410 that is controlling the virtual application during the debug process. The MDM 411 eliminates the traditional debugging model where the debugger for a given programming language only has knowledge of a specific source and object code mapping.

Instead, the MDM 411 places the burden of language specific details on the programming language to determine, for example, the mapping of a breakpoint requested by the debug user to a specific instruction in the programming language code within a given application. For an interpreted programming language, a programming language specific decision is passed through the PDM 424 to an appropriate language engine 422423. For a compiled programming language, a programming language specific decision is passed through the PDM 424 to a library of source and object codes associated with an appropriate language engine 422–423.

The active scripting application components 420 include a script host 421 and at least one language engine 422–423, and each of the at least one language engine 422–423 operate in close cooperation with the PDM 424. The PDM 424 includes a catalog of components within a given application, and acts as an interface for all in-process activities and synchronizes the debugging activities of the multiple language engines 422423 such as merging stack frames and coordinating breakpoints for example. The PDM 424 also maintains a debugger thread for asynchronous processing and acts as the communication interface for the MDM 411 and the IDE 410.

A language engine 422–423 supports a specific language implementation and provides specific language features used by the corresponding program language code in the virtual application. Among the specific language features are the breakpoint, start, stop, and jump debug implementations, expression evaluations, syntax coloring, object browsing, and stack frame enumeration. Each language specific feature is unique to a programming language regardless of the quantity of that programming language that exists in the virtual application.

The application or script host 421 provides the environment for the language engines 422–423. Additional tasks of the script host 421 include supporting an object model, providing context for scripts, organizing scripts into virtual applications, maintaining a tree of documents being debugged and their contents, and providing overall document management. An example of a script host is an Internet browser such as Internet Explorer or Spruuids. One important script host concept is that a host does not necessarily require a design that has debugging in mind because it is the programming language that must have been created with debugging in mind. For this reason, the script host 421 does not require specific knowledge of any language specific debugging features. Specific knowledge of language specific debugging features is the task of the individual language engines 422–423 and/or their associated libraries.

It is also important to note that depending on the design of a script host 421, the script host 421 can exist in the active debugging environment 400 as a smart host or a dumb host. A dumb host is not aware of all available debug interfaces because all scripts are separate and/or are managed by language engines independently of each other, and no contextual view of source code exists. Nevertheless, a dumb host can support self-contained languages such as Java and can provide a default virtual application for the current process. Alternatively, a smart host is aware of the debug interfaces and can group program code and documents into a single virtual application to provide visual context to embedded languages such as HTML. The smart host takes advantage of and supports integrated debugging support across a mixed model of programming languages and is generally aware of the context and origin of individual scripts. Although, a smart host provides a more robust and efficient debugging environment, debugging can proceed in kind for a dumb host even if with somewhat limited flexibility.

Figure 5:
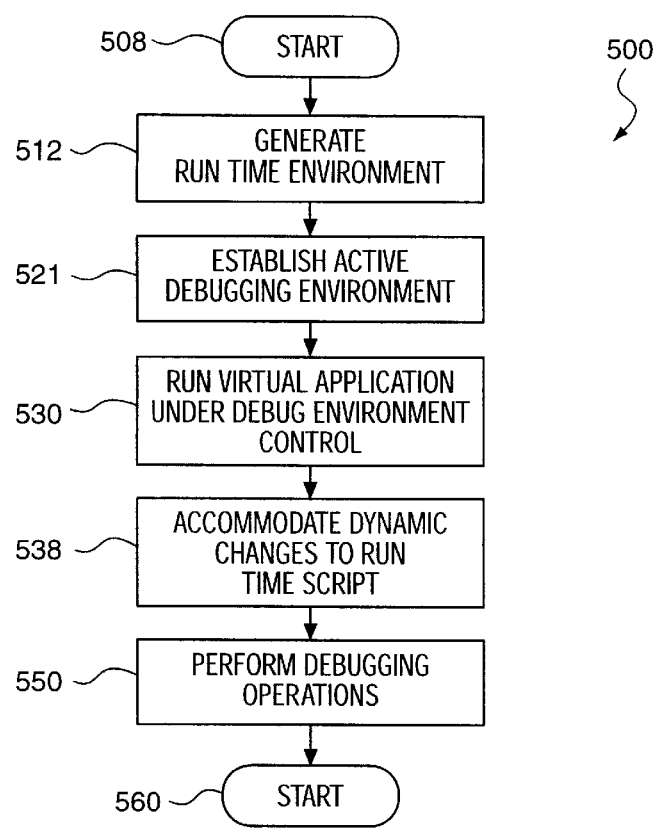
FIG. 5 illustrates an overview of the active debugging operational steps in flow diagram form.
Figure 6:
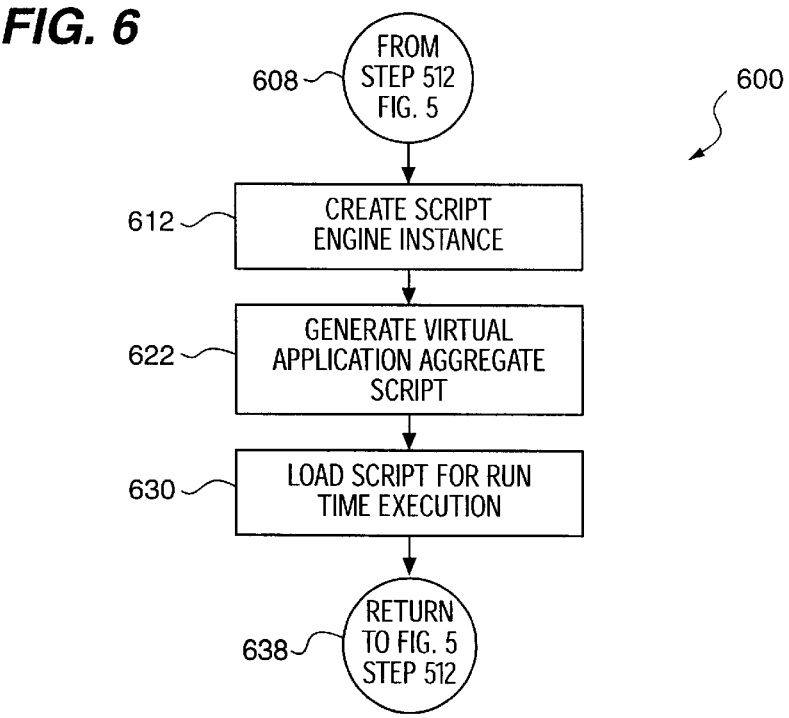
FIG. 6 illustrates operational details of the run time environment for a virtual application in flow diagram form.
Figure 7:
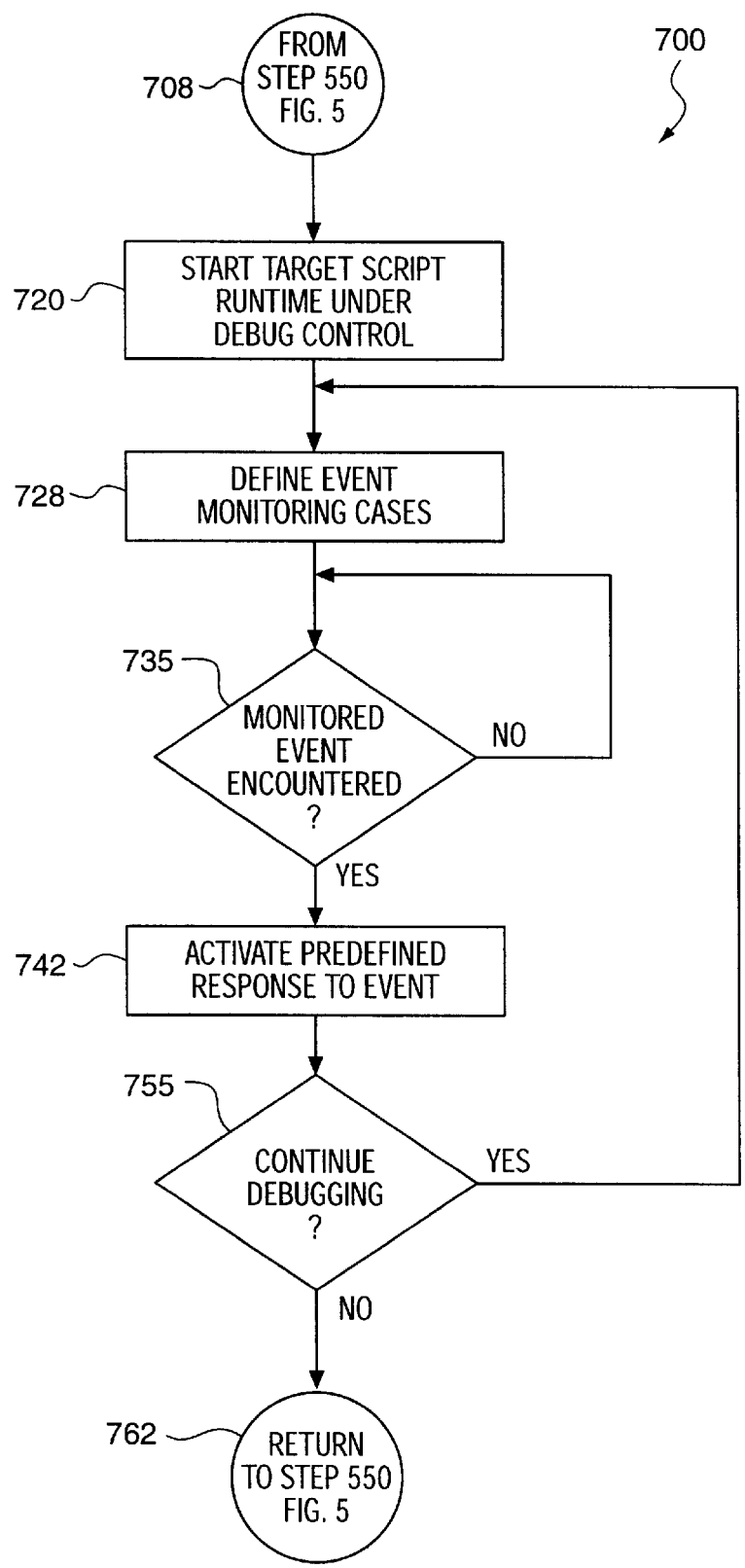
FIG. 7 illustrates details of the active debugging environment operational steps in flow diagram form.

Active Debugging Environment Operational Steps—FIGS. 5–7

FIG. 5 illustrates an example overview of active debugging environment operational steps 500 in flow diagram form. The active debugging environment operational steps 500 begin at step 508 and represent a high-level view of steps involved in the setup and operation of an active debugging environment where programming language code from multiple compiled and/or interpreted programming languages are present in the same virtual application debug target.

At step 512, the script host 421 generates a virtual application for run time execution. The virtual application can contain program language code from only single programming language, or the virtual application can contain an aggregate of programming language code from multiple compiled and/or interpreted programming languages. Additional details of step 512 are disclosed in the text accompanying FIG. 6.

At step 521, an active debugging environment is established that controls the stepwise flow of a run time script. Key to the active debugging environment 400 being programming language neutral and content-centric host neutral is that the programming language debug specifics are embedded in the active scripting application components 420 rather than in the debugging tool itself. Key responsibilities of the active debugging environment 400 is to facilitate programming language neutral and host neutral debugging by interfacing the IDE 410 user interface with the active scripting application components 420 by way of the catalog of applications maintained in the MDM 411 and the catalog of application components in the PDM 424. The MDM 411 and the PDM 424 determine which application and which language engine 422-423 is responsible for a given section of program language code in the virtual application as previously disclosed in the text accompanying FIG. 4.

At step 530, with the run time environment established and the active debug environment in place, the previously generated virtual application is executed under the control of the active debugging environment 400. Note that during run time of the virtual application at step 538, that the active debugging environment 400 accommodates the dynamic run-time modification of program code in the script without disrupting script execution flow or the active debugging operations. One reason this dynamic run-time environment is possible even with the existence of compiled programming language segments present, is that each programming language segment added to or removed from the running script is accompanied by the necessary language engine support to assist with the language specific debug details.

At step 550, a debug user or application developer interacts with the active debugging environment during the debugging process by way of the IDE 410. Additional details of the debugging process interactions are disclosed in the text accompanying FIG. 7. The active debug operational steps 500 end at step 560 at the time the application developer chooses to stop the debugging process.

FIG. 6 illustrates details of the active scripting run-time environment operational steps 600 for a virtual application in flow diagram form. The active scripting run-time environment operational steps 600 begin at step 608 and represent the details of step 512 of FIG. 5. Although the text accompanying FIG. 6 discloses the details of one type of run-time environment for virtual applications, the active debugging environment 400 of the present invention is host neutral and functions equally well with any COM designed active scripting run-time environment.

At step 612, an instance of a script host 421 is created in an application 220 to manage run-time execution of a virtual application. Along with the script host 421, at least one programming language engine 422-423 is generated for each programming language used in an application. At step 622, the multiple objects within the application are combined into a single virtual application, also known as script text. At step 630 the single virtual application is loaded into the script host 421 for run-time execution. Processing continues at step 638 by returning to step 512 of FIG. 5.

FIG. 7 illustrates details of debugging operational steps 700 in flow diagram form in the context of the active debugging environment 400. The debugging operational steps 700 begin at step 708 and represent the details of step 550 in FIG. 5. At step 712, an active debugging environment 400 is established that includes an IDE 410 as a user interface, a MDM 411 to catalog applications that are present and manage language specific interactions with each target application, and a PDM 424 to catalog application components and manage component specific activities during the debug process. At step 720, the virtual application script and the script host 421 are identified and the virtual application is run under the control of the active debugging environment 400. Starting a virtual application under the control of an active debugging environment means that breakpoints, stepwise code execution, and/or other script flow altering activities can be set at will by a human user to alter the run-time script flow as desired during the debug process.

At step 728, one or more event monitoring cases can be set in the active debugging environment 400 by communicating the event criteria to the appropriate active scripting application components 420 by way of the MDM 411 and/or PDM 424, and the IDE 410 user interface. Each event is specific to a given portion of the run-time script text even though the script text programming language details are transparent to the debug user. Further, the number of event monitoring cases defined for a given virtual application can be dynamically altered as different programming language code sections are downloaded to the script host 421 to dynamically become part of the running virtual application.

If it is determined at decision step 735 that the run-time script text has not reached an event being monitored, then the run-time script text continues running at step 735. In the mean time, the debug user is free to carry out other activities in the context of the active debugging environment that can include, but are not limited to, viewing other documents, the document tree, source code, or even make changes to the source code as desired. Alternatively, if it is determined at decision step 735 that the run-time script text has reached an event being monitored, then processing continues at step 742. At step 742, a predefined debugging response is activated in response to the occurrence of the monitored event. Predefined responses can include, but are not limited to, displaying a range of script text that contains a breakpoint, displaying variable or other reference contents, and displaying stack pointers,-all within the context supported by the corresponding language engine specific to the immediate programming language statements. All communications between the debug user and the script host 421 are facilitated by the MDM 411 and/or the PDM 424 that process and pass requests to an appropriate language engine 422-423 for a response.

If it is determined at decision step 755 by the debug user that the debugging process should continue, then processing continues at step 728 as previously disclosed. Alternative, if it is determined at decision step 755 by the debug user that the debugging process is complete, then the debug communicates to the IDE 410 that debug processing should stop and processing continues at step 762 by returning to step 550 of FIG. 5.

Conclusion

The present invention is an active debugging environment that is programming language independent and host application independent for use in debugging a mixture of compiled and interpreted programming languages in a given application. The programming language and host application independence is facilitated by Machine Debug Manager and Process Debug Manager interfaces that identify an appropriate language engine and/or application specific components that is responsible for unique programming language details.

Appendices are attached to this document that disclose examples of active run-time script engine interfaces and active debugging environment interfaces.

Specific active run-time script implementation interfaces are disclosed in Appendix A. Specific active debugging environment implementation interfaces are disclosed in Appendix B.

Although specific embodiments are disclosed herein, it is expected that persons skilled in the art can and will make, use, and/or sell alternative active debugging environment systems that are within the scope of the following claims either literally or under the Doctrine of Equivalents.

Appendix A: ActiveX Scripting

Interfaces and Methods

IActiveScript

The scripting engine must implement the IActiveScript interface in order to be an ActiveX Scripting engine.

| Methods in Vtable Order | |
|---|---|
| Description | |
| IUnknown methods | |
| QueryInterface | Returns pointers to supported interfaces. |
| AddRef | Increments the reference count. |
| Release | Decrements the reference count. |
| IActiveScript methods | |
| SetScriptSite | Informs the scripting engine of the IActiveScriptSite site provided by the host. |
| GetScriptSite | Retrieves the site object associated with the ActiveX Scripting engine. |
| SetScriptState | Puts the scripting engine into the given state. |
| GetScriptState | Retrieves the current state of the scripting engine. |
| Close | Causes the scripting engine to abandon any currently loaded script, lose its state, and release any interface pointers it has to other objects, thus entering a closed state. |
| AddNamedItem | Adds the name of a root-level item to the scripting engine's name space. |
| AddTypeLib | Adds a type library to the name space for the script. |
| GetScriptDispatch | Retrieves the IDispatch interface for the methods and properties associated with the running script itself. |
| GetCurrentScriptThreadID | Retrieves a scripting-engine-defined identifier for the currently executing thread. |
| GetScriptThreadID | Retrieves a scripting-engine-defined identifier for the thread associated with the given Microsoft Win32 ® thread. |
| GetScriptThreadState | Retrieves the current state of a script thread. |
| InterruptScriptThread | Interrupts the execution of a running script thread. |
| Clone | Clones the current scripting engine (minus any current execution state), returning a loaded, unsited scripting engine in the current thread. |

```
IActiveScript::AddNamedItem
HRESULT AddNamedItem (
    LPCOLESTR pstrName,     //    address of item name
    DWORD dwFlags           //    item flags
);
```

Adds the name of a root-level item to the scripting engine's name space. A root-level item is an object with properties and methods, an event source, or both.
pstrName

[in] Address of a buffer that contains the name of the item as viewed from the script. The name must be unique and persistable.
dwFlags

[in] Flags associated with item. Can be a combination of these values:

| | Meaning |
|---|---|
| Value | |
| SCRIPTITEM_ISPERSISTENT | Indicates that the item should be saved if the scripting engine is saved. Similarly, setting this flag indicates that a transition back to the initialized state should retain the item's |

-continued

| | Meaning |
|---|---|
| | name and type information (the scripting engine must, however, release all pointers to interfaces on the actual object). |
| SCRIPTITEM_ISSOURCE | Indicates that the item sources events that the script can sink. Children (properties of the object that are in themselves objects) can also source events to the script. This is not recursive, but it provides a convenient mechanism for the common case, for example, of adding a container and all of its member controls. |
| SCRIPTITEM_ISVISIBLE | Indicates that the item's name is available in the name space of the script, allowing access to the properties, methods, and events of the item. Because by convention the properties of the item include the item's children, all child object properties and methods (and their children, recursively) will be accessible. |
| SCRIPTITEM_GLOBALMEMBERS | Indicates that the item is a collection of global properties and methods associated with the script. Normally, a scripting engine would ignore the object name (other than for the purpose of using it as a cookie for IActiveScriptSite::GetItemInfo, or for resolving explicit scoping) and expose its members as global variables and methods. This allows the host to extend the library (run-time functions and so on) available to the script. It is left to the scripting engine to deal with name conflicts (for example, when two SCRIPTITEM_GLOBALMEMBERS items have methods of the same name), although an error should not be returned because of this situation. |
| SCRIPTITEM_NOCODE | Indicates that the item is simply a name being added to the script's name space, and should not be treated as an item for which code should be associated. For example, without this flag being set, VBScript will create a separate module for the named item, and C++ might create a separate wrapper class for the named item. |
| SCRIPTITEM_CODEONLY | Indicates that the named item represents a code-only object, and that the host has no IUnknown to be associated with this code-only object. The host only has a name for this object. In object-oriented languages such as C++, this flag would create a class. Not all languages support this flag. |
| Returns | |
| S_OK | The named item was successfully added to the script's name space. |
| E_UNEXPECTED | The call was not expected (for example, the scripting engine |

| | Meaning |
|---|---|
| | has not been loaded or initialized. |
| E_POINTER | An invalid pointer was specified. |
| E_INVALIDARG | An argument was invalid. |

See also

IActiveScriptSite::GetItemInfo

```
IActiveScript::AddTypeLib
HRESULT AddTypeLib (
    REFGUID guidTypeLib,   //LIBID of type library
    DWORD dwMaj,    //  major version number
    DWORD dwMin,    //  minor version number
    DWORD dwFlags   //  option flags
);
```

Adds a type library to the name space for the script. This is similar to the #include directive in C/C++. It allows a set of predefined items such as class definitions, typedefs, and named constants to be added to the run-time environment available to the script.

guidTypeLib

[in] LIBID of the type library to add.

dwMaj

[in] Major version number.

dwMin

[in] Minor version number.

dwFlags

[in] Option flags. Can be SCRIPTTYPELIB_ISCONTROL, which indicates that the type library describes an ActiveX control used by the host.

Returns

| | |
|---|---|
| S_OK | The specified type library was successfully added. |
| E_UNEXPECTED | The call was not expected (for example, the scripting engine has not yet been loaded or initialized). |
| TYPE_E_CANTLOADLIBRARY | The specified type library could not be loaded. |
| E_INVALIDARG | An argument was invalid. |

```
IActiveScript::Clone
HRESULT Clone (
    IActiveScript **ppscript   //   receives pointer to IActiveScript
);
```

Clones the current scripting engine (minus any current execution state), returning a loaded, unsited scripting engine in the current thread. The state of this new scripting engine should be identical to the state the original scripting engine would be in if it were transitioned back to the initialized state.

ppscript

[out] Address of a variable that receives a pointer to the IActiveScript interface of the unsited, cloned scripting engine. The host must create a site and call SetScriptSite on the new scripting engine before it will be in the initialized state and, therefore, usable.

The Clone method is an optimization of IPersist*::Save, CoCreateinstance, and IPersist*::Load, so the state of the new scripting engine should be the same as if the state of the original scripting engine were saved and loaded into a new scripting engine. Named items are duplicated in the cloned scripting engine, but specific object pointers for each item are forgotten and are obtained with GetItemIinfo. This allows an identical object model with per-thread entry points (an apartment model) to be used.

This method is used for multithreaded server hosts that can run multiple instances of the same script. The scripting engine may return E_NOTIMPL, in which case the host can achieve the same result by duplicating the persistent state and creating a new instance of the scripting engine with Ipersist*.

This method can be called from non-base threads without resulting in a non-base callout to host objects or to IActiveScriptSite.

Returns

| | |
|---|---|
| S_OK | The scripting engine was successfully cloned. |
| E_NOTIMPL | The Clone method is not supported. |
| E_POINTER | An invalid pointer was specified. |
| E_UNEXPECTED | The call was not expected (for example, the scripting engine has not yet been loaded or initialized). |

See also

IActiveScript::SetScriptSite, IActiveScriptSite, IActiveScriptSite::GetItemInfo

IActiveScript::Close

HRESULT Close (void);

Causes the scripting engine to abandon any currently loaded script, lose its state, and release any interface pointers it has to other objects, thus entering a closed state. Event sinks, immediately executed script text, and macro invocations that are already in progress are completed before the state changes (use InterruptScriptThread to cancel a running script thread). This method must be called by the creating host before it calls Release to prevent circular reference problems.

Returns

| | |
|---|---|
| S_OK | The script was successfully cloned. |
| S_FALSE | The method succeeded, but the script was already closed. |
| OLESCRIPT_S_PENDING | The method was queued successfully, but the state hasn't changed yet. When the state changes, the site will be called back on IActiveScriptSite::OnStateChange. |
| E_UNEXPECTED | The call was not expected (for example, the scripting engine was already in the closed state). |

See also

> IActiveScript::InterruptScriptThread,
> IActiveScriptSite:: OnStateChange

```
IActiveScript::GetCurrentScriptThreadID
HRESULT GetCurrentScriptThreadID (
    SCRIPTTHREADID *pstidThread    //    receives scripting thread
    identifier
);
```

Retrieves a scripting-engine-defined identifier for the currently executing thread. The identifier can be used in subsequent calls to script thread execution-control methods such as InterruptScriptThread.

pstidThread

[out] Address of a variable that receives the script thread identifier associated with the current thread. The interpretation of this identifier is left to the scripting engine, but it can be just a copy of the Windows thread identifier. If the Win32 thread terminates, this identifier becomes unassigned and can subsequently be assigned to another thread.

This method can be called from non-base threads without resulting in a non-base callout to host objects or to IActiveScriptSite.

| Returns | |
|---|---|
| S_OK | The identifier was successfully retreived. |
| E_POINTER | An invalid pointer was specified. |

See also

> IActiveScript::InterruptScriptThread,
> IActiveScriptSite

```
IActiveScript::GetScriptDispatch
HRESULT GetScriptDispatch (
    LPCOLESTR pstrItemName  //  address of item name
    IDispatch **ppdisp      //  receives IDispatch pointer
);
```

Retrieves the IDispatch interface for the methods and properties associated with the running script itself.

pstrItemName

[in] Address of a buffer that contains the name of the item for which the caller needs the associated dispatch object. If this parameter is NULL, the dispatch object contains as its members all of the global methods and properties defined by the script. Through the IDispatch interface and the associated ITypeInfo interface, the host can invoke script methods or view and modify script variables.

ppdisp

[out] Address of a variable that receives a pointer to the object associated with the script's global methods and properties. If the scripting engine does not support such an object, NULL is returned.

Because methods and properties can be added by calling IActiveScriptParse, the IDispatch interface returned by this function can dynamically support new methods and properties. Similarly, IDispatch::GetTypeInfo should return a new, unique ITypeInfo when methods and properties are added. Note, however, that language engines must not change the IDispatch interface in a way that is incompatible with any previous ITypeInfo interface returned. That implies, for example, that DISPIDs will never be reused.

| Returns | |
|---|---|
| S_OK | The dispatch object for the script was successfully retreived. |
| S_FALSE | The scripting engine does not support a dispatch object; the ppdispparameter is set to NULL. |
| E_UNEXPECTED | The call was not expected (for example, the scripting engine has not yet been loaded or initialized). |
| E_POINTER | An invalid pointer was specified. |
| E_INVALIDARG | An argument was invalid. |

```
IActiveScript::GetScriptSite
HRESULT GetScriptSite (
    REFIID iid,              //  interface identifier
    void **ppvSiteObject     //  address of host site interface
);
```

Retrieves the site object associated with the ActiveX Scripting engine.

iid

[in] Identifier of the requested interface.

ppvSite Object

[out] Address of the location that receives the interface pointer to the host's site object.

| Returns | |
|---|---|
| S_OK | The site object was successfully retreived. |
| S_FALSE | No site has been set; ppvSiteObject is set to NULL. |
| E_POINTER | An invalid pointer was specified. |
| E_INVALIDARG | An argument was invalid. |
| E_NOINTERFACE | The specified interface is not supported. |

```
IActiveScript::GetScriptState
HRESULT GetScriptState (
    SCRIPTSTATE *pss //  address of structure for state information
);
```

Retrieves the current state of the scripting engine. This method can be called from non-base threads without resulting in a non-base callout to host objects or to IActiveScriptSite.

pss

[out] Address of a variable that receives a value defined in the SCRIPTSTATE enumeration. The value indicates the current state of the scripting engine associated with the calling thread.

| Returns | |
|---|---|
| S_OK | The state information was successfully retrieved. |
| E_POINTER | An invalid pointer was specified. |

See also

IActiveScriptSite, SCRIPTSTATE

---

IActiveScript: :GetScriptThreadID
HRESULT GetScriptThreadID (
    DWORD dwWin32ThreadID, //    Win32 thread identifier
    SCRIPTTHREADID *pstidThread //  receives scripting thread
                                                                identifier
);

---

Retrieves a scripting-engine-defined identifier for the thread associated with the given Win32 thread. This identifier can be used in subsequent calls to script thread execution control methods such as InterruptScriptThread.

dwWin32ThreadID
    [in] Thread identifier of a running Win32 thread in the current process. Use the GetCurrentScriptThreadID function to retrieve the thread identifier of the currently executing thread.

pstidThread
    [out] Address of a variable that receives the script thread identifier associated with the given Win32 thread. The interpretation of this identifier is left to the scripting engine, but it can be just a copy of the Windows thread identifier. Note that if the Win32 thread terminates, this identifier becomes unassigned and may subsequently be assigned to another thread.

This method can be called from non-base threads without resulting in a non-base callout to host objects or to IActiveScriptSite.

---

Returns

| | |
|---|---|
| S_OK | The identifier was successfully retrieved. |
| E_POINTER | An invalid pointer was specified. |
| E_UNEXPECTED | The call was not expected (for example, the scripting engine has not yet been loaded or initialized). |

See also

IActiveScript::InterruptScriptThread, IActiveScriptSite

---

IActiveScript::GetScriptThreadState
HRESULT GetScriptThreadState (
    SCRIPTTHREADID stidThread, // identifier of script thread
    SCRIPTTHREADSTATE *pstsState //    receives state flag
);

---

Retrieves the current state of a script thread.

stidThread
    [in] Identifier of the thread for which the state is desired, or one of the following special thread identifiers:

| Value | Meaning |
|---|---|
| SCRIPTTHREADID_CURRENT | The currently executing thread. |
| SCRIPTTHREADID_BASE | The base thread; that is, the thread in which the scripting engine was instantiated. | pstsState
    [out] Address of a variable that receives the state of the indicated thread. The state is indicated by one of the named constant values defined by the SCRIPTTHREADSTATE enumeration. If this parameter does not identify the current thread, the state may change at any time.

This method can be called from non-base threads without resulting in a non-base callout to host objects or to IActiveScriptSite.

---

Returns

| | |
|---|---|
| S_OK | The current state was successfully retrieved. |
| E_POINTER | An invalid pointer was specified. |
| E_UNEXPECTED | The call was not expected (for example, the scripting engine has not yet been loaded or initialized). |

See also

IActiveScriptSite, SCRIPTTHREADSTATE

---

IActiveScript::InterruptScriptThread
HRESULT InterruptScriptThread (
    SCRIPTTHREADID   stidThread, //    identifier of thread
    const EXCEPINFO    *pexcepinfo, // receives error information
    DWORD dwFlags
);

---

Interrupts the execution of a running script thread (an event sink, an immediate execution, or a macro invocation). This method can be used to terminate a script that is stuck (for example, in an infinite loop). It can be called from non-base threads without resulting in a non-base callout to host objects or to IActiveScriptSite.

stid Thread
    [in] Thread identifier of the thread to interrupt, or one of the following special thread identifier values:

| Value | Meaning |
|---|---|
| SCRIPTTHREADID_CURRENT | The currently executing thread |
| SCRIPTTHREADID_BASE | The base thread; that is, the thread in which the scripting engine was instantiated. |
| SCRIPTTHREADID_ALL | All threads. The interrupt is applied to all script methods currently in progress. Note that unless the caller has requested that the script be disconnected, by calling SetScriptState with the SCRIPTSTATE_DISCONNECTED or SCRIPTSTATE_INITIALIZED flag, the next scripted event causes script code to run again. | pexcepinfo
    [in] Address of an EXCEPINFO structure that receives error information associated with the error condition.

dwFlags
    [in] Option flags associated with the interruption. Can be one of these values:

SCRIPTINTERRUPT_DEBUG
    If supported, enter the scripting engine's debugger at the current script execution point.

SCRIPTINTERRUPT_RAISEEXCEPTION

If supported by the scripting engine's language, let the script handle the exception. Otherwise, the script method is aborted and the error code is returned to the caller; that is, the event source or macro invoker.

| Returns | |
|---|---|
| S_OK | The given thread was successfully interrupted. |
| E_POINTER | An invalid pointer was specified. |
| E_INVALIDARG | An argument was invalid. |
| E_UNEXPECTED | The call was not expected (for example, the scripting engine has not yet been loaded or initialized). |

See also

IActiveScript::SetScriptState, IActiveScriptSite

IActiveScript::SetScriptSite
HRESULTS SetScriptSite (
    IActiveScriptSite *pScriptSite  //    address of host script site
);

Informs the scripting engine of the IActiveScriptSite site provided by the host. This method must be called before any other IActiveScript methods can be used.
pScriptSite
    [in] Address of the host-supplied script site to be associated with this instance of the scripting engine. The site must be uniquely assigned to this scripting engine instance; cannot be shared with other scripting engines.

| Returns | |
|---|---|
| S_OK | The host site was set successfully. |
| E_POINTER | An invalid pointer was spicified. |
| E_INVALIDARG | An argument was invalid. |
| E_FAIL | An unspecified error occurred; the scripting engine was unable to finish initializing the site. |
| E_UNEXPECTED | The call was not expected (for example, a site was already set). |

See also

IActiveScriptSite

IActiveScript::SetScriptState
HRESULT SetScriptState (
    SCRIPTSTATE ss  //    identifier of new state
);

Puts the scripting engine into the given state. This method can be called from non-base threads without resulting in a non-base callout to host objects or to IActiveScriptSite.
    [in] Sets the scripting engine to the given state. Can be one of the values defined in the SCRIPTSTATE enumeration:
SCRIPTSTATE_INITIALIZED
Returns the scripting engine back to the initialized state from the started, connected, or disconnected state. Because languages can vary widely in semantics, scripting engines are not required to support this state transition. Engines that support IActiveScript::Clone must, however, support this state transition. Hosts must prepare for this transition and take the appropriate action: Release the current scripting engine, create a new scripting engine, and call Load or InitNew (and possibly also call ParseScriptText). Use of this transition should be considered an optimization of the above steps. Note that any information the scripting engine has obtained about the names of Named Items and the type information describing Named Items remains valid.

Because languages vary widely, defining the exact semantics of this transition is difficult. At a minimum, the scripting engine must disconnect from all events, and release all of the SCRIPTINFO_IUNKNOWN pointers obtained by calling IActiveScriptSite::GetItemInfo. The engine must refetch these pointers after the script is run again. The scripting engine should also reset the script back to an initial state that is appropriate for the language. VBScript, for example, resets all variables and retains any code added dynamically by calling IActiveScriptParse with the SCRIPTTEXT_ISPERSISTENT flag set. Other languages may need to retain current values (such as Lisp because there is no code/data separation) or reset to a well-known state (this includes languages with statically initialized variables). These languages may or may not retain code added by calling IActiveScriptParse.

Note that the transition to the started state should have the same semantics (that is, it should leave the scripting engine in the same state) as calling lPersist*::Save to save the scripting engine, and then calling IPersist*::Load to load a new scripting engine; these actions should have the same semantics as IActiveScript::Clone. Scripting engines that do not yet support Clone or IPersist* should carefully consider how the transition to the started state should behave, so that such a transition would not violate the above conditions if Clone or Ipersist* support was later added.

During this transition to the started state, the scripting engine will disconnect from event sinks after the appropriate destructors, and so on, are executed in the script. To avoid having these destructors executed, the host can first move the script into the disconnected state before moving into the started state.

Use InterruptScriptThread to cancel a running script thread without waiting for current events, and so on, to finish running.
SCRIPTSTATE_STARTED
The transition to this mode causes any code that was queued during the initialized state to be executed. From this state, script code can be executed, for example, by calling IActiveScriptParse::ParseScriptText or by calling the IDispatch interface obtained from IActiveScript::GetScriptDispatch. The transition to this state is also the appropriate time to execute routines such as a main()-like script routine, if appropriate for the script language.
SCRIPTSTATE_CONNECTED
Causes the script to connect to events. If this is a transition from the initialized state, the scripting engine should transition through the started state, performing the necessary actions, before entering the connected state and connecting to events.
SCRIPTSTATE_DISCONNECTED
Causes the script to disconnect from event sinks. This can be done either logically (ignoring events received) or physically (calling Unadvise on the appropriate connection points). Returning to the connected state reverses this process. If this is a transition from the initialized state, the scripting engine should transition through the started state, performing the necessary actions, before entering the disconnected state. Event sinks that are in progress are completed before the state changes (use InterruptScriptThread to cancel a running script thread). The script's execution state is maintained. For example, an HTML browser may put the scripting engine into this state when a scripted HTML page is moved into the LRU cache, before the page is actually destroyed.

| Returns | |
|---|---|
| S_OK | The script successfully entered the given state. |
| S_FALSE | The method succeeded, but the script was already in the given state. |
| OLESCRIPT_S_PENDING | The method was queued successfully, but the state hasn't changed yet. When the state changes, the site will be called back through the IActiveScriptSite::OnStateChange method. |
| E_FAIL | The scripting engine does not support the transition back to the initializedstate. The host must discard this scripting engine and create, initialize, and load a new scripting engine to achieve the same effect. |
| E_UNEXPECTED | The call was not expected (for example, the scripting engine has not yet been loaded or initialized). |

See also

IActiveScript::Clone,
IActiveScript::GetScriptDispatch,
IActiveScript::InterruptScriptThread,
IActiveScriptParse::ParseScriptText,
IActiveScriptSite, IActiveScriptSite::GetItemInfo,
IActiveScriptSite::OnStateChange, SCRIPTSTATE IActiveScriptParse If the ActiveX Scripting engine allows raw text code scriptlets to be added to the script, or allows expression text to be evaluated at run time, it implements IActiveScriptParse. For interpreted scripting languages that have no independent authoring environment, such as Visual Basic Script, this provides an alternate mechanism (other than Ipersist*) to get script code into the scripting engine, and to attach script fragments to various object events.

| Methods in Vtable Order | |
|---|---|
| | Description |
| IUnknown methods | |
| QueryInterface | Returns pointers to supported interfaces. |
| AddRef | Increments the reference count. |
| Release | Decrements the reference count. |
| IActiveScriptParse Methods | |
| InitNew | Initialzes the scripting engine. |
| AddScriptlet | Adds a code scriptlet to the script. |
| ParseScriptText | Parses the given code scriptlet, adding declarations into the name space and evaluating code as appropriate. |

```
IActiveScriptParse::AddScriptlet
HRESULT AddScriptlet (
    LPCOLESTR pstrDefaultName,    // address of default name of
      scriptlet
    LPCOLESTR pstrCode,           // address of scriptlet text
    LPCOLESTR pstrItomName,       // address of item name
    LPCOLESTR pstrSubItemName,    // address of subitem name
    LPCOLESTR pstrEventName,      // address of event name
    LPCOLESTR pstrEndDelimiter    // address of end-of-scriptlet
      delimiter
    DWORD dwFlags,                // scriptlet flags
    BSTR *pbstrName,              // address of actual name of
                                     scriptlet
    EXCEPINFO *pexcepinfo         // address of exception
                                     information
);
```

Adds a code scriptlet to the script. This method is used in environments where the persistent state of the script is intertwined with the host document and must be restored under the host's control, rather than through IPersist*. The primary examples are HTML scripting languages that allow scriptlets of code embedded in the HTML document to be attached to intrinsic events (for example, ONCLICK= "button1.text='Exit'").

pstrDefaultName

[in] Address of a default name to associate with the scriptlet. If the scriptlet does not contain naming information (as in the ONCLICK example above), this name will be used to identify the scriptlet. If this parameter is NULL, the scripting engine manufactures a unique name, if necessary.

pstrcode

[in] Address of the scriptlet text to add. The interpretation of this string depends on the scripting language.

pstrItemName

[in] Address of a buffer that contains the item name associated with this scriptlet. This parameter, in addition to pstrSubItemName, identifies the object for which the scriptlet is an event handler.

pstrSubitemName

[in] Address of a buffer that contains the name of a subobject of the named item with which this scriptlet is associated; this name must be found in the named item's type information. This parameter is NULL if the scriptlet is to be associated with the named item instead of a subitem. This parameter, in addition to pstrItemName, identifies the specific object for which the scriptlet is an event handler.

pstrEventName

[in] Address of a buffer that contains the name of the event for which the scriptlet is an event handler.

pstrEndDelimiter

[in] Address of the end-of-scriptlet delimiter. When pstrcode is parsed from a stream of text, the host typically uses a delimiter, such as two single quotation marks ("), to detect the end of the scriptlet. This parameter specifies the delimiter that the host used, allowing the scripting engine to provide some conditional primitive preprocessing (for example, replacing a single quotation mark ['] with two single quotation marks for use as a delimiter). Exactly how (and if) the scripting engine makes use of this information depends on the scripting engine. Set this parameter to NULL if the host did not use a delimiter to mark the end of the scriptlet.

dwFlags

[in] Flags associated with the scriptlet. Can be a combination of the following values:

| Value | Meaning |
|---|---|
| SCRIPTTEXT_ISVISIBLE | Indicates that the script text should be visible (and, therefore, callable by name) as a global method in the name space of the script. |
| SCRIPTTEXT_ISPERSISTANT | Indicates that the code added during this call should be saved if the scripting engine is saved (for example, through a call to IPersist*::Save), or if the scripting engine is reset by way of a transition back to the initialized state. | pbstrName

[out] The actual name used to identify the scriptlet. This will be, in order of preference: a name explicitly specified in the scriptlet text, the default name provided in pstrDefaultName, or a unique name synthesized by the scripting engine.

pexcepinfo

[out] Pointer to a structure containing exception information. This structure should be filled in if DISP_E_EXCEPTION is returned.

| Returns | |
|---|---|
| S_OK | The scriptlet was successfully added to the script-the pbstrName parameter contains the scriptlet's name. |
| OLESCRIPT_E_INVALIDNAME | The default name supplied is invalid in this scripting language. |
| OLESCRIPT_E_SYNTAX | An unspecified syntax error occurred in the scriptlet. |
| DISP_E_EXCEPTION | An exception occurred in the parsing of the scriptlet; the pexcepinfo parameter contains information about the exception. |
| E UNEXPECTED | The call was not expected (for example, the scripting engine has not yet been loaded or initialized). |
| E_NOTIMPL | This method is not supported; the scripting engine does not support adding event-sinking scriptlets. |
| E_POINTER | An invalid pointer was specified. |
| E_INVALIDARG | An argument was invalid. |

IActiveScriptParse::InitNew

HRESULT InitNew (void);

Initializes the scripting engine. Before the scripting engine can be used, one of the following methods must be called: IPersist*::Load, IPersist*::InitNew, or IActiveScriptParse::InitNew. The semantics of this method are identical to IPersistStreaminit::InitNew, in that this method tells the scripting engine to initialize itself. Note that it is not valid to call both InitNew and Load, nor is it valid to call InitNew or Load more than once.

| Returns | |
|---|---|
| S_OK | The scripting engine was successfully initialized. |
| E_FAIL | An error occurred during initialization. |

IActiveScriptParse::ParseScriptText
```
HRESULT ParseScriptText (
    LPCOLESTR pstrCode,          //  address of scriptlet text
    LPCOLESTR pstrItemName,      //  address of item name
    IUnknown *punkContext,       //  address of debugging context
    LPCOLESTR pstrEndDelimiter,  //  address of end-of-scriptlet
                                 //    delimiter
    DWORD dwFlags,               //  scriptlet flags
    VARIANT *pvarResult,         //  address of buffer for results
    EXCEPINFO *pexcepinfo        //  address of buffer for error
                                 //    data
);
```

Parses the given code scriptlet, adding declarations into the name space and evaluating code as appropriate.

pstrCode

[in] Address of the scriptlet text to evaluate. The interpretation of this string depends on the scripting language.

pstrItemName

[in] Address of the item name that gives the context in which the scriptlet is to be evaluated. If this parameter is NULL, the code is evaluated in the scripting engine's global context.

punkContext

[in] Address of context object. This object is reserved for use in a debugging environment, where such a context may be provided by the debugger to represent an active run-time context. If this parameter is NULL, the engine uses pstrItemName to identify the context.

pstrEndDelimiter

[in] Address of the end-of-scriptlet delimiter. When pstrcode is parsed from a stream of text, the host typically uses a delimiter, such as two single quotation marks ("), to detect the end of the scriptlet. This parameter specifies the delimiter that the host used, allowing the scripting engine to provide some conditional primitive preprocessing (for example, replacing a single quotation mark ['] with two single quotation marks for use as a delimiter). Exactly how (and if) the scripting engine makes use of this information depends on the scripting engine. Set this parameter to NULL if the host did not use a delimiter to mark the end of the scriptlet.

dwFlags

[in] Flags associated with the scriptlet. Can be a combination of these values:

| Value | Meaning |
|---|---|
| SCRIPTTEXT_ISEXPRESSION | If the distinction between a computational expression and a statement is important but syntactically ambiguous in the script language, this flag specifies that the scriptlet is to be interpreted as an expression, rather than as a statement or list of statements. By default, statements are assumed unless the correct choice can be determined from the syntax of the scriptlet text. |
| SCRIPTTEXT_ISPERSISTENT | Indicates that the code added during this call should by saved if the scripting engine is saved (for example, through a call to IPersis*::Save), or if the scripting engine is |

-continued

| Value | Meaning |
|---|---|
| SCRIPTTEXT_ISVISIBLE | reset by way of a transition back to the initialized state. Indicates that the script text should be visible (and, therefore, callable by name) as a global method in the name space of the script. | pvarResult

[out] Address of a buffer that receives the results of scriptlet processing, or NULL if the caller expects no result (that is, the SCRIPTTEXT_ISEXPRESSION value is not set).

pexcepinfo

[out] Address of a structure that receives exception information. This structure is filled if ParseScriptText returns DISP_E_EXCEPTION.

If the scripting engine is in the initialized state, no code will actually be evaluated during this call; rather, such code is queued and executed when the scripting engine is transitioned into (or through) the started state. Because execution is not allowed in the initialized state, it is an error to call this method with the SCRIPTTEXT_ISEXPRESSION flag when in the initialized state.

The scriptlet can be an expression, a list of statements, or anything allowed by the script language. For example, this method is used in the evaluation of the HTML <SCRIPT> tag, which allows statements to be executed as the HTML page is being constructed, rather than just compiling them into the script state.

The code passed to this method must be a valid, complete portion of code. For example, in VBScript it is illegal to call this method once with Sub Foo(x) and then a second time with End Sub. The parser must not wait for the second call to complete the subroutine, but rather must generate a parse error because a subroutine declaration was started but not completed.

| Returns | |
|---|---|
| S_OK | The expression or statement(s) has been evaluated. The pvarResult parameter contains the result, if any. |
| E_POINTER | An invalid pointer was specified. |
| E_INVALIDARG | An argument was invalid. |
| E_UNEXPECTED | The call was not expected (for example, the scripting engine is in the uninitialized or closed state, or the SCRIPTTEXT_IS-EXPRESSION flag was set and the scripting engine is in the initialized state). |
| DISP_E_EXCEPTION | An exception occurred in the processing of the scriptlet. the pexcepinfo parameter contains information about the exception. |
| OLESCRIPT_E_SYNTAX | An unspecified syntax error occurred in the scriptlet. |
| E_NOTIMPL | This method is not supported. The scripting engine does not support run-time evaluation of expressions or statements. |

IActiveScriptError

An object implementing this interface is passed to IActiveScriptSite::OnScriptError whenever the scripting engine encounters an unhandled error. The host then calls methods on this object to obtain information about the error that occurred.

| Methods in Vtable Order | |
|---|---|
| Decription | |
| IUnknown methods | |
| QueryInterface | Returns pointers to supported interfaces. |
| AddRef | Increments the reference count. |
| IActiveScriptError methods | |
| GetExceptionInfo | Retrieves information about an error. |
| GetSourcePosition | Retrieves the location in the source code where an error occurred. |
| GetSourceLineText | Retrieves the line in the source file where an error occurred. |

IActiveScriptError::GetExceptionInfo
HRESULT GetExceptionInfo (
    EXCEPINFO *pexcepinfo    // structure for exception information
);

Retrieves information about an error that occurred while the scripting engine was running a script.

pexcepinfo

[out] Address of an EXCEPINFO structure that receives error information.

| Returns | |
|---|---|
| S_OK | The error information was successfully retrieved. |
| E_FAIL | An error occurred. |

IActiveScriptError::GetSourceLineText
HRESULT GetSourceLineText (
    BSTR *pbstrSourceLine    //   address of buffer for source line
);

Retrieves the line in the source file where an error occurred while a scripting engine was running a script.

pbstrSourceLine

[out] Address of a buffer that receives the line of source code in which the error occurred.

| Returns | |
|---|---|
| S_OK | The line in the source file was successfully retrieved. |
| E_FAIL | An error occurred. |

IActiveScriptError::GetSourcePosition
HRESULT GetSourcePosition (
    DWORD *pdwSourceContext,   //   context cookie
    ULONG *pulLineNumber,      //   line number of error
    LONG *pichCharPosition     //   character position of error
);

Retrieves the location in the source code where an error occurred while the scripting engine was running a script.

pdwSourceContext

[out] Address of a variable that receives a cookie that identifies the context. The interpretation of this parameter depends on the host application.

pulLineNumber

[out] Address of a variable that receives the line number in the source file where the error occurred.

pichCharPosition

[out] Address of a variable that receives the character position in the line where the error occurred.

| Returns | |
|---|---|
| S_OK | The error location was successfully retrieved. |
| E_FAIL | An error occurred. |

IActiveScriptSite

The host must create a site for the ActiveX Scripting engine by implementing IActiveScriptSite. Usually, this site will be associated with the container of all the objects that are visible to the script (for example, the ActiveX controls). Typically, this container will correspond to the document or page being viewed. Internet Explorer, for example, would create such a container for each HTML page being displayed. Each ActiveX control (or other automation object) on the page, and the scripting engine itself, would be enumerable within this container.

| Methods in Vtable Order | |
|---|---|
| | Description |
| IUnknown methods | |
| Queryinterface | Returns pointers to supported interfaces. |
| AddRef | Increments the reference count. |
| Release | Decrements the reference count. |
| IActiveScriptSite methods | |
| GetLCID | Retrieves the locale identifier that the host uses for displaying user-interface elements. |
| GetItemInfo | Obtains information about an item that was added to an engine through a call to the IActiveScript::AddNamedItem method. |
| GetDocVersionString | Retrieves a host-defined string that uniquely identifies the current document version from the host's point of view. |
| OnScriptTerminate | Informs the host that the script has completed execution. |
| OnStateChange | Informs the host that the scripting engine has changed states. |
| OnScriptError | Informs the host that an execution error occurred while the engine was running the script. |
| OnEnterScript | Informs the host that the scripting engine has begun executing the script code. |
| OnLeaveScript | Informs the host that the scripting engine has returned from executing script code. |

IActiveScriptSite::GetDocVersionString
HRESULT GetDocVersionString (
    BSTR *pbstrVersionString   //  address of document version string
);

Retrieves a host-defined string that uniquely identifies the current document version from the host's point of view. If the related document has changed outside the scope of ActiveX Scripting (as in the case of an HTML page being edited with NotePad), the scripting engine can save this along with its persisted state, forcing a recompile the next time the script is loaded.

pstrVersionString

[out] Address of the host-defined document version string.

| Returns | |
|---|---|
| S_OK | The document version string was successfully retrieved. The pstrVersionString parameter contains the string. |
| E_NOTIMPL | This method is not supported. The scripting engine should assume that the script is in sync with the document. |

IActiveScriptSite::GetItemInfo
HRESULT IActiveScriptSite::GetItemInfo (
    LPCOLESTR pstrName;        //  address of item name
    DWORD dwReturnMask,        //  bit mask for information
                               //    retrieval
    IUnknown **ppunkItem,      //  address of pointer to item's
                               //    IUnknown
    ITypeInfo **ppTypeInfo     //  address of pointer to item's
                               //    ITypeInfo
);

Allows the scripting engine to obtain information about an item added with IActiveScript::AddNamedItem.

pstrName

[in] The name associated with the item, as specified in IActiveScript::AddNamedItem.

dwReturnMask

[in] A bit mask specifying what information about the item should be returned. The scripting engine should request the minimum needed information because some of the return parameters (for example, ITypeinfo) can take considerable time to load or generate. Can be a combination of the following values:

| Value | Meaning |
|---|---|
| SCRIPTINFO_IUNKNOWN | Return the IUnknown interface for this item. |
| SCRIPTINFO_ITYPEINFO | Return the ITypeInfo interface for this item. | ppunkitem

[out] Address of a variable that receives a pointer to the IUnknown interface associated with the given item. The scripting engine can use the QueryInterface method to obtain the IDispatch interface for the item. This parameter receives NULL if dwReturnMask does not include the SCRIPTINFO_IUNKNOWN value. Also, it receives NULL if there is no object associated with the item name; this mechanism is used to create a simple class when the named item was added with the SCRIPTITEM CODEONLY flea set.

ppTypeInfo

[out] Address of a variable that receives a pointer to the ITypeInfo interface associated with the item. This parameter receives NULL if dwReturnMask does not include the SCRIPTINFO_ITYPEINFO value, or if type information is not available for this item. If type information is not available, the object cannot source events, and name binding must be realized with IDispatch::GetIDsOfNames. Note that this ITypeInfo describes the coclass (TKIND_COCLASS) because the object may support multiple interfaces and event interfaces. If the item supports the IProvideMultipleTypeInfo interface, the ITypeInfo interface corresponds to the ITypeInfo of index zero obtained from IProvideMultipleTypeInfo::GetinfoOfIndex.

This method retrieves only the information indicated by the dwReturnMask parameter. This improves performance, for example, in the case where an ITypeInfo interface is not needed for an item.

| Returns | |
|---|---|
| S_OK | The requested interface pointer was successfully retrieved. The ppunkItem or ppTypeInfo parameter contains the pointer. |
| E_POINTER | An invalid pointer was specified. |
| E_INVALIDARG | An argument was invalid. |
| TYPE_E_ELEMENTNOTFOUND | An item of the specified name was not found. |

See also

IActiveScript::AddNamedItem

IActiveScriptSite::GetLCID
HRESULT GetLCID (
    LCID *plcid    //   address of variable for language identifier
);

Retrieves the locale identifier associated with the host's user interface. The scripting engine uses the identifier to ensure that error strings and other user-interface elements surfaced by the engine appear in the appropriate language. If this method returns E_NOTIMPL, the system-defined locale identifier should be used.

plcid

[out] Address of a variable that receives the locale identifier for user-interface elements displayed by the scripting engine.

| Returns | |
|---|---|
| S_OK | The locale identifier was successfully retrieved. The plcid parameter contains the identifier. |
| E_POINTER | An invalid pointer was specified. |
| E_NOTIMPL | This method is not implemented. Use the system-defined locale. |

IActiveScriptSite::OnEnterScript
HRESULT OnEnterScript (void);

Informs the host that the scripting engine has begun executing the script code.

The scripting engine must call this method on every entry or reentry into the scripting engine. For example, if the script calls an object that then fires an event handled by the scripting engine, the scripting engine must call OnEnterScript before executing the event, and must call OnLeaveScript after executing the event but before returning to the object that fired the event. Calls to this method can be nested. Every call to OnEnterScript requires a corresponding call to OnLeaveScript.

| Returns | |
|---|---|
| S_OK | The method succeeded. |

See also

IActiveScriptSite::OnLeaveScript

IActiveScriptSite::OnLeaveScript

HRESULT IActiveScriptSite::OnLeaveScript (void);

Informs the host that the scripting engine has returned from executing script code.

The scripting engine must call this method before returning control to a caller that entered the scripting engine. For example, if the script calls an object that then fires an event handled by the scripting engine, the scripting engine must call OnEnterScript before executing the event, and must call OnLeaveScript after executing the event before returning to the object that fired the event. Calls to this method can be nested. Every call to OnEnterScript requires a corresponding call to OnLeaveScript.

| Returns | |
|---|---|
| S_OK | The method was successful. |

See also

IActiveScriptSite::OnEnterScript

IActiveScriptSite::OnScriptError
HRESULT IActiveScriptSite::OnScriptError (
    IActiveScriptError*pase    //   address of error interface
);

Informs the host that an execution error occurred while the engine was running the script.

pase

[in] Address of the error object's IActiveScriptError interface. A host can use this interface to obtain information about the execution error.

| Returns | |
|---|---|
| S_OK | The scripting engine should continue running the script as best as possible (perhaps abandoning the processing of this event). |
| S_FALSE | The scripting engine should continue running the script in the debugger, if a debugger is available. If a debugger is not available, this error should be handled in the same way as E_FAIL. |
| E_FAIL | The scripting engine should abort execution of the script and return it to the initialized state. In this case, the pexcepinfo parameter obtained from IActiveScriptError::GetExceptionInfo is generally passed to OnScriptTerminate. |

See also

IActiveScriptError,
IActiveScriptError::GetExceptionInfo

---

IActiveScriptSite::OnScriptTerminate
HRESULT OnScriptTerminate (
    VARIANT *pvarResult,  //  address of script results
    EXCEPINFO *pexcepinfo  //  address of structure with exception information
);

Informs the host that the script has completed execution.
pvarResult
    [in] Address of a variable that contains the script result, or NULL if the script produced no result.
pexcepinfo
    [in] Address of an EXCEPINFO structure that contains exception information generated when the script terminated, or NULL if no exception was generated.

The scripting engine calls this method before the call to OnStateChange(SCRIPTSTATE_INITIALIZED) is completed. The OnScriptTerminate method can be used to return completion status and results to the host. Note that many script languages, which are based on sinking events from the host, have life spans that are defined by the host. In this case, this method may never be called.

| Returns | |
|---|---|
| S_OK | The method succeeded. |

---

IActiveScriptSite::OnStateChange
HRESULT IActiveScriptSite::OnStateChange (
    SCRIPTSTATE ssScriptState //    new state of engine
);

Informs the host that the scripting engine has changed states.
ssScriptState
    [in] Value that indicates the new script state. See IActiveScript::GetScriptState for a description of the states.

| Returns | |
|---|---|
| S_OK | The method succeeded. |

See also

IActiveScript::GetScriptState

IActiveScriptSiteWindow

This interface is implemented by hosts that support a user interface on the same object as IActiveScriptSite. Hosts that do not support a user interface, such as servers, would not implement the IActiveScriptSiteWindow interface. The scripting engine accesses this interface by calling Queryinterface from IActiveScriptSite.

| Methods in Vtable Order | |
|---|---|
| IUnknown methods | Description |
| QueryInterface | Returns pointers to supported interfaces. |
| AddRef | Increments the reference count. |
| Release | Decrements the reference count. |

| IActiveScriptSiteWindow methods | Description |
|---|---|
| GetWindow | Retrieves the window handle that can act as the owner of a pop-up window that the scripting engine needs to display. |
| EnableModeless | Causes the host to enable or disable its main window as well as any modeless dialog boxes. |

---

IActiveScriptSite::EnableModeless
HRESULT IActiveScriptSite::EnableModeless (
    BOOL fEnable    //  enable flag
);

Causes the host to enable or disable its main window as well as any modeless dialog boxes.
fEnable
    [in] Flag that, if TRUE, enables the main window and modeless dialogs or, if FALSE, disables them.
This method is identical to IOIeInPlaceFrame::EnableModeless.
Calls to this method can be nested.

| Returns | |
|---|---|
| S_OK | The method was successful. |
| E_FAIL | An error occurred. |

---

IActiveScriptSite::GetWindow
HRESULT GetWindow (
    HWND *phwnd //   address of variable for window handle
);

Retrieves the handle of a window that can act as the owner of a pop-up window that the scripting engine needs to display.
phwnd
    [out] Address of a variable that receives the window handle.
This method is similar to lOleWindow::GetWindow.

| Returns | |
|---|---|
| S_OK | The window handle was successfully retrieved. |
| E_FAIL | An error occurred. |

Enumerations

```
SCRIPTSTATE
typedef enum tagSCRIPTSTATE {
   SCRIPTSTATE_UNINITIALIZED = 0,
   SCRIPTSTATE_INITIALIZED = 5,
   SCRIPTSTATE_STARTED = 1,
   SCRIPTSTATE_CONNECTED = 2,
   SCRIPTSTATE_DISCONNECTED = 3,
   SCRIPTSTATE_CLOSED = 4,
} SCRIPTSTATE;
```

Contains named constant values that specify the state of a scripting engine. This enumeration is used by the IActiveScript::GetScriptState, IActiveScript::SetScriptState, and IActiveScriptSite::OnStateChange methods.

Elements

| | |
|---|---|
| SCRIPTSTATE_UNINITIALIZED | The script has just been created, but has not yet been initialized using an IPersist* interface and IActiveScript::SetScriptSite. |
| SCRIPTSTATE_INITIALIZED | The script has been initialized, but is not running (connecting to other objects or sinking events) or executing any code. Code can be queried for execution by calling IActiveScriptParse::ParseScriptText. |
| SCRIPTSTATE_STARTED | The script can execute code, but is not yet sinking the events of objects added by the IActiveScript::AddNamedItem method. |
| SCRIPTSTATE_CONNECTED | The script is loaded and connected for sinking events. |
| SCRIPTSTATE_DISCONNECTED | The script is loaded and has a runtime execution state, but is temporarily disconnected from sinking events. |
| SCRIPTSTATE_CLOSED | The script has been closed. The scripting engine no longer works and returns errors for most methods. |

See also

IActiveScript::GetScriptState,
IActiveScript::SetScriptState,
IActiveScriptSite::OnStateChange

```
SCRIPTTHREADSTATE
typedef enum tagSCRIPTTHREADSTATE {
   SCRIPTTHREADSTATE_NOTINSCRIPT = 0,
   SCRIPTTHREADSTATE_RUNNING = 1
} SCRIPTTHREADSTATE;
```

Contains named constant values that specify the state of a thread in a scripting engine. This enumeration is used by the IActiveScript::GetScriptThreadState method.
Elements
SCRIPTTHREADSTATE_NOTINSCRIPT
The specified thread is not currently servicing a scripted event, processing immediately executed script text, or running a script macro.
SCRIPTTHREADSTATE_RUNNING
The specified thread is actively servicing a scripted event, processing immediately executed script text, or running a script macro.

See also

IActiveScript::GetScriptThreadState

Appendix B: Active Debugging Environment Interfaces

Language Engine

IactiveScriptDebug; // provides syntax coloring and code context enumeration

IactiveScriptErrorDebug; // returns document contexts and stack frames for errors IActiveScriptSiteDebug; // host provided link from script engine to debugger IActiveScriptTextInfo; // Language engine debugging abstractions IDebugCodeContext; // a virtual "instruction pointer" in a thread IEnumDebugCodeContexts;

IDebugStackFrame; // logical stack frame on the stack of a thread

IDebugExpressionContext; // a context in which expressions can be evaluated

IDebugStackFrameSniffer; // enumerator for stack frames known by an engine

IDebugExpressionContext; // context for expression evaluation

IDebugExpression; // an asynchronously evaluated expression

IDebugSyncOperation;

IDebugAsyncOperation;

IDebugAsyncOperationCallBack;

IDebugExpressionCallBack; // status events for IDebugExpression evaluation progress IEnumDebugExpressionContexts;

IProvideExpressionContexts; // Object browsing

IDebug Formatter;

Hosts

Smart-host Helper Interfaces

IDebugDocumentHelper; // implemented by PDM

IDebugDocumentHost; // implemented (optionally) by the host

Full Smart-host Interfaces

// implemented by host

IDebugDocumentInfo; // provides info on (possibily uninstantiated) doc

IDebugDocumentProvider; // allows doc to be instantiated on demand

IDebugDocument; // base document interface

IDebugDocumentText; // provides access to source text of document

IDebugDocumentTextEvents; // events fired when source text changes

IDebugDocumentTextAuthor;

IDebugDocumentContext; // represents a range within the document

// implemented by PDM on behalf of the host

IDebugApplicationNode; // represents the position of a doc in the hierarchy

IDebugApplicationNodeEvents; // events fired by PDM when document hierarchy changes Debugger IDE The IDE is a fully language independent debugging UI. It provides:

Document viewers/editors.
Breakpoint management.
Expression evaluation and watch windows.
Stack frame browsing.
Object/Class browsing.
Browsing the virtual application structure.
// Debugger implementation
IDebugSessionProvider; // establishes a debug session for a running application.
IApplicationDebugger; // primary interface exposed by a debugger IDE session Machine Debug Manager The machine debug manager provides the hookup point between virtual applications and debuggers by maintaining and enumerating a list of active virtual applications.

IMachineDebugManager;
IMachineDebugManagerCookie;
IMachineDebugManagerEvents;
IEnumRemoteDebugApplications;

Process Debug Manager

The PDM does the following:

Synchronizes the debugging of multiple language engines.
Maintains a tree of debuggable documents
Merges stack frames.
Coordinates breakpoints and stepping across language engines.
Tracks threads.
Maintains a debugger thread for asynchronous processing.
Communicates with the machine debug manager and the debugger IDE.

The following are the interfaces provided by the process debug manager

IProcessDebugManager; // creates, adds and removes virtual applications, etc.
IRemoteDebugApplication; // virtual application abstraction
IDebugApplication;
IRemoteDebugApplicationThread; // virtual thread abstraction
IDebugApplicationThread;
IEnumRemoteDebugApplicationThreads;
IDebugThreadCall; // dispatches marshalled calls
IDebugApplicationNode; // maintains a position for a document in the hierarchy
IEnumDebugApplicationNodes;
IEnumDebugStackFrames; // merged enumeration of stack frames from engines Structures and Enumerations
BREAKPOINT_STATE
// Indicates the state of a breakpoint
typedef enum tagBREAKPOINT_STATE {
BREAKPOINT_DELETED=0, // Breakpoint no longer exists but references exist
BREAKPOINT_DISABLED=1, // Breakpoint exists but is disabled
BREAKPOINT_ENABLED=2 1 // Breakpoint exists and is enabled
} BREAKPOINT_STATE;

APPBREAKFLAGS
// Application break flags indicate the current application debug state and thread typedef DWORD APPBREAKFLAGS;
// DEBUGGER_BLOCK
// languages should break immediately with BREAKREASON_DEBUGGER_BLOCK const APPBREAKFLAGSAPPBREAKFLAG_DEBUGGER_BLOCK=0x00000001;
// DEBUGGER_HALT
// languages should break immediately with BREAKREASON_DEBUGGER_HALT const APPBREAKFLAGSAPPBREAKFLAG_DEBUGGER_HALT=x00000002;
// STEP
// languages should break immediately in the stepping thread with BREAKREASON_STEP const APPBREAKFLAGSAPPBREAKFLAG_STEP=0x00010000;
// NESTED—the application is in nested execution on a breakpoint const APPBREAKFLAGSAPPBREAKFLAG_NESTED=0x00020000;
// STEP TYPES—defines whether we are stepping at source, bytecode, or machine level.
const APPBREAKFLAGSAPPBREAKFLAG_STEPTYPE_SOURCE=0x00000000;
const APPBREAKFLAGSAPPBREAKFLAG_STEPTYPE_BYTECODE=0x00100000;
const APPBREAKFLAGSAPPBREAKFLAG_STEPTYPE_MACHINE=0x00200000;
const APPBREAKFLAGSAPPBREAKFLAG_STEPTYPE_MASK=0x00F00000;
// BREAKPOINT IN_PROGRESS const APPBREAKFLAGSAPPBREAKFLAG_IN_BREAKPOINT=0x80000000;

BREAKREASON
// Indicates the cause of hitting a breakpoint
typedef enum tagBREAKREASON{
BREAKREASON_STEP, // Caused by the stepping mode BREAKREASON_BREAKPOINT, // Caused by an explicit breakpoint BREAKREASON_DEBUGGER_BLOCK, // Caused by another thread breaking BREAKREASON_HOST_INITIATED, // Caused by host requested break BREAKREASON_LANGUAGE_INITIATED, // Caused by a scripted break BREAKREASON_DEBUGGER_HALT, // Caused by debugger IDE requested break BREAKREASON_ERROR // Caused by an execution error } BREAKREASON;

BREAKRESUME_ACTION
// How to continue from a breakpoint
typedef enum tagBREAKRESUME_ACTION{
BREAKRESUMEACTION_ABORT, // Abort the application BREAKRESUMEACTION_CONTINUE, // Continue running BREAKRESUMEACTION_STEP_INTO, // Step into a procedure BREAKRESUMEACTION_STEP_OVER, // Step over a procedure BREAKRESUMEACTION_STEP_OUT // Step out of the current procedure } BREAKRESUMEACTION;

ERRORRESUME_ACTION
// How to continue from a run time error.

```
typedef enum tagERRORRESUMEACTION {
    ERRORRESUMEACTION_
    ReexecuteErrorStatement, // re-execute the erroneous line     ERRORRESUMEACTION_
    AbortCallAndReturnErrorToCaller, I let language engine handle the error ERRORRESUMEACTION_
    SkipErrorStatement, // resume execution beyond the error } ERRORRESUMEACTION;
DOCUMENTNAMETYPE
    // The type of name desired for a document.
    typedef enum tagDOCUMENTNAMETYPE {
        DOCUMENTNAMETYPE_APPNODE, // Get name as it appears in the app tree
        DOCUMENTNAMETYPE_TITLE, // Get name as it appears on the doc viewer title bar
        DOCUMENTNAMETYPE_FILE_TAIL, // Get filename without a path (for save as...)
        DOCUMENTNAMETYPE_URL, // Get URL of the document, if any } DOCUMENTNAMETYPE;
SOURCE_TEXT_ATTR
    // Attributes of a single character of source text.
    typedef WORD SOURCE_TEXT_ATTR;
    // The character is a part of a language keyword. Example: while    const  SOURCE_TEXT_ATTR SOURCETEXT_ATTR_KEYWORD=0x0001;
    // The character is a part of a comment block.
    const SOURCE_TEXT_ATTR SOURCETEXT_ATTR_COMMENT=0x0002;
    // The character is not part of compiled language source text. Example:
    // the HTML surrounding script blocks.
    const SOURCE_TEXT_ATTR SOURCETEXT_ATTR_NONSOURCE=0x0004;
    // The character is a part of a language operator. Example:
    *
    const SOURCE_TEXT_ATTR SOURCETEXT_ATTR_OPERATOR=0x0008;
    // The character is a part of a language numeric constant. Example: 1234
    const SOURCE_TEXT_ATTR SOURCETEXT_ATTR_NUMBER=0x0010;
    // The character is a part of a language string constant. Example: "Hello World"
    const SOURCE_TEXT_ATTR SOURCETEXT_ATTR_STRING=0x0020;
    // The character indicates the start of a function block
    const SOURCE_TEXT_ATTR SOURCETEXT_ATTR_FUNCTION_START 0x0040;
TEXT_DOC_ATTR
    // Document attributes
    typedef DWORD TEXT_DOC_ATTR;
    // Indicates that the document is read-only.
    const TEXT_DOC_ATTR TEXT_DOC_ATTR_READONLY =x000000001;
Parse Flags
    // Indicates that the text is an expression as opposed to a statement. This
    // flag may affect the way in which the text is parsed by some languages.
    const DWORD DEBUG_TEXT_ISEXPRESSION=0x00000001;
    // If a return value is available, it will be used by the caller.
    const DWORD DEBUG_TEXT_RETURNVALUE=0x00000002;
    // Don't allow side effects. If this flag is set, the evaluation of the
    // expression should change no runtime state.
    const DWORD DEBUG_TEXT_NOSIDEEFFECTS=0x00000004;
    // Allow breakpoints during the evaluation of the text. If this flag is not
    // set then breakpoints will be ignored during the evaluation of the text.
    const DWORD DEBUG_TEXT_ALLOWBREAKPOINTS=0x00000008;
    // Allow error reports during the evaluation of the text. If this flag is not
    // set then errors will not be reported to the host during the evaluation.
    const DWORD DEBUG_TEXT_ALLOWERRORREPORT=0x00000010;
Language/Script Engine Debugging Interfaces
    Interfaces required by a language engine for debugging, browsing, & expression evaluation.
IActiveScriptDebug
    // Provides a way for smart hosts to take over document management and for the
    Process Debug Manager to synchronize debugging of multiple language engines. [
    object,
    uuid(51973C10-CB0C-11d0-B5C9-00A0244A0E7A),
    pointer_default(unique) ]
    interface IActiveScriptDebug: Unknown {
    // Returns the text attributes for an arbitrary block of script text. Smart hosts
    // use this call to delegate GetText calls made on their IDebugDocumentText.
    HRESULT GetScriptTextAftributes(
    // The script block text. This string need not be null terminated.
    [in, size_is(u Nu mCodeChars)]LPCOLESTRpstrCode,
    // The number of characters in the script block text.
    [in]ULONGuNumCodeChars,
    // See IActiveScriptParse::ParseScriptText for a description of this argument.
    [in]LPCOLESTRpstrDelimiter,
    // See IActiveScriptParse::ParseScriptText for a description of this argument.
    [in]DWORDdwFlags,
    // Buffer to contain the returned attributes.
    [in, out, size-is(uNumCodeChars)]SOURCE_TEXT_ATTR *pattr);
    // Returns the text attributes for an arbitrary scriptlet. Smart hosts
    // use this call to delegate GetText calls made on their IDebugDocumentText.
    // Note: this call is provided because scriptlets tend to be expressions and
    // may have a different syntax than a script block. For many languages the implementation
    // will be identical to GetScriptTextAftributes.
    HRESULT GetScriptletTextAttributes(
    // The script block text. This string need not be null terminated.
```

```
[in, size_is(uNumCodeChars)]LPCOLESTRpstrCode,
// The number of characters in the script block text.
[in]ULONGuNumCodeChars,
// See IActiveScriptParse::AddScriptlet for a description
    of this argument.
[in]LPCOLESTRpstrDelimiter,
// See IActiveScriptParse::AddScriptlet for a description
    of this argument.
[in]DWORDdwFlags,
// Buffer to contain the returned attributes.
[in, out, size_is(uNumCodeChars)]SOURCE_TEXT_
    ATTR *pattr);
// Used by the smart host to delegate
// DebugDocumentContext::EnumDebugCodeContexts.
HRESULT EnumCodeContextsOfPosition(
[in]DWORD dwSourceContext,// As provided to
IActiveScriptParse::ParseScriptText
// or IActiveScriptParse::AddScriptlet
[in]ULONG uCharacterOffset,// character offset relative
// to start of script text
[in]ULONG uNumChars,// Number of characters in context
// Returns an enumerator of code contexts.
[out] IEnumDebugCodeContexts **ppescc); }
IActiveScriptSiteDebug
    Implemented by smart hosts and is Ql-able from IActive-
ScriptSite. It provides the means by which a smart host takes
over document management and participates in debugging.
[
object,
uuid(51973C11-CB0C-11d0-B5C9-00A0244A0E7A),
pointer_default(unique),
local
]
// Used by the language engine to delegate
IDebugCodeContext::GetSourceContext.
HRESULT GetDocumentContextFromPosition(
[in]DWORD dwSourceContext,// As provided to Pars-
    eScriptText
// or AddScriptlet
[in]ULONG uCharacterOffset,// character offset relative
// to start of script block or scriptlet
[in]ULONG uNumChars,// Number of characters in context
// Returns the document context corresponding to this
    character-position range.
[out] IDebugDocumentContext **ppsc);
// Returns the debug application object associated with
    this script site. Provides
// a means for a smart host to define what application
    object each script belongs to.
// Script engines should attempt to call this method to get
    their containing application
// and resort to IProcessDebugManager::GetDe-
    faultApplication if this fails.
HRESULT GetApplication(
[out] IDebugApplication **ppda);
// Gets the application node under which script documents
    should be added
// can return NULL if script documents should be top-
    level.
HRESULT GetRootApplicationNode(
[out] IDebugApplicationNode **ppdanRoot);
// Allows a smart host to control the handling of runtime
    errors
HRESULT OnScriptErrorDebug(
// the runtime error that occurred
[in] IActiveScriptErrorDebug *pErrorDebug,
// whether to pass the error to the debugger to do JIT
    debugging
[out]BOOL*pfEnterDebugger,
// whether to call IActiveScriptSite::QnScriptError()
    when the user
// decides to continue without debugging
[out]BOOL *pfCallOnScriptErrorWhenContinuing); }
IActiveScriptErrorDebug
    Provides document context information from compile and
    run time errors.
[
object,
uuid(51973C12-CB0 C-11d0-B5C9-00A0244A0E7A),
pointer_default(unique)
]
interface IActiveScriptErrorDebug: IActiveScriptError
// Provides the document context for the associated error.
    The character-position range
// should include the entire offending text.
HRESULT GetDocumentContext(
[out] IDebugDocumentContext **ppssc);
// For runtime errors, provides the stack frame that is in
    effect.
HRESULT GetStackFrame(
[out] IDebugStackFrame **ppdsf); }
IdebugCodeContext
    Abstraction reresenting a position in executable code as a
virtual app counter.
object,
uuid(51973C13-CB0C-11d0-B5C9-00A0244A0E7A),
pointer_default(unique)
]
interface IDebugCodeContext:IUnknown
{
// Returns the document context associated with this code
    context.
// Note: For text documents, the character-position
// range should include the text for the entire statement.
    This allows the debugger
IDE
// to hilight the current source statement.
HRESULT GetDocumentContext(
[out] IDebugDocumentContext **ppsc);
// Sets or clears a breakpoint at this code context.
HRESULT SetBreakPoint(
[in] BREAKPOINT_STATE bps);
}
IDebugExpression
    Abstract representation of an asynchronously evaluated
expression.
```

```
object,
uuid(51973C14-CB0C-11d0-B5C9-00A0244A0E7A),
pointer_default(unique)
]
interface IDebugExpression : IUnknown {
// Begins the evaluation of the expression.
HRESULT Start(
// Provides an event driven means for indicating that the
    expression evaluation
// is complete. If NULL, no events will be fired and the
    client will need to
// poll the expression state using QueryIsComplete.
[in] IDebugExpressionCallBack *pdecb);
// Aborts the expression. Evaluation of an expression in
    progress will be stopped
// at the earliest opportunity. If the expression is actually
    aborted,
GetResultAsString
// will return E_ABORT as phrResult.
HRESULT Abort(void);
// Returns S_FALSE if the operation is still pending.
// Returns S_OK if the operation is complete.
HRESULT QueryIsComplete(void);
// Returns the result of the expression evaluation as a
    string and an HRESULT.
Returns
// E_PENDING if the operation is still pending. Returns
    S_OK and E_ABORT in phrResult
// when the operation was aborted with Abort.
HRESULT GetResultAsString(
[out] HRESULT *phrResult,
[out] BSTR *pbstrResult);
// Returns the result of the expression evaluation as an
// IDebugProperty and an HRESULT. Returns
// E_PENDING if the operation is still pending. Returns
    S_OK and E_ABORT in phrResult
// when the operation was aborted with Abort.
HRESULT GetResultAsDebugProperty(
[out] HRESULT *phrResult,
[out] IDebugProperty **ppdp);
}
IDebugExpressionContext
Abstract representation of a context in which expressions
can be evaluated.
    object,
    uuid(51973C15-CB0C-11d0-B5C9-00A0244A0E7A),
    helpstring("IDebugExpressionContext Interface"),
    pointer_default(unique)
]
interface IDebugExpressionContext : IUnknown
// Creates an IDebugExpression for the specified text.
HRESULT ParseLanguageText(
// Provides the text of the expression or statement(s).
[in]LPCOLESTRpstrCode,
// Radix to use
[in]UINTnRadix,
// See IActiveScriptParse::ParseScriptText
[in]LPCOLESTRpstrDelimiter,
// See above flags.
[in]DWORDdwFlags,
// Returns the IDebugExpression for the given text.
[out] IdebugExpression **ppe );
// Returns a name and GUID for the language owning this
    context
HRESULT GetLanguageInfo (
[out] BSTR*pbstrLanguageName, // the name of the
    language
[out] GUID*pLanguageID // an unique id for this lan-
    guage }
IDebugExpressionCallback
Provides status events related to progress of an IdebugEx-
pression evaluation.
[
object,
uuid(51973C16-CB0C-11d0-B5C9-00A0244A0E7A),
pointer_default(unique)
]
interface IDebugExpressionCallBack : IUnknown
{
// Indicates that the expression evaluation is complete.
    Note that
// IDebugExpression::GetResultAsString can be called
    from within this event
// handler.
HRESULT onComplete(void);
IDebugStackFrame
Abstraction representing a logical stack frame on the
stack of a thread.
    object,
    uuid(51973C17-CB0C-11d0-B5C9-00A0244A0E7A),
    pointer_default(unique)
interface IDebugStackFrame: Unknown
{
// Returns the current code context associated with the
    stack frame.
HRESULT GetCodeContext(
[out] IdebugCodeContext **ppcc);
// Returns a short or long textual description of the stack
    frame.
// Normally, when fLong if false, this will provide only the
    name of the
// function associated with the stack frame. When flong is
    true it may
// also provide the parameter(s) to the function or what-
    ever else is // relevant.
HRESULT GetDescriptionString(
[in] BOOL flong,
[out] BSTR *pbstrDescription);
// Returns a short or long textual description of the
    language. When flong
// is false, just the language name should be provided, eg,
    "Pascal". When
// fLong is true a full product description may be
    provided, eg,
// "Gnat Software's Flaming Pascal v3.72".
HRESULT GetLanguageString(
[in] BOOL flong,
[out] BSTR *pbstrLanguage);
```

```
// Returns the thread associated with this stack frame.
HRESULT GetThread(
[out] IdebugApplicationThread **ppat);
// Returns a property browser for the current frame (locals,
    etc.)
HRESULT GetDebugProperty(
[out] IDebugProperty **ppDebugProp);
}
IDebugStackFrameSniffer
    Provides a means for enumerating logical stack frames
known by a certain component.
[
object,
uuid(51973C18-CB0C-11d0-B5C9-00A0244A0E7A),
pointer_default(unique)
interface IDebugStackFrameSniffer : IUnknown
{
// Returns an enumerator of stack frames for the current
    thread. Top of stack should
// be returned first (the most recently pushed frame).
HRESULT EnumStackFrames(
[out] IenumDebugStackFrames **ppedsf);
}
IDebugStackFrameSnifferEx
    Provides a means for enumerating logical stack frames
known by a certain component.
[
object,
uuid (51973C19-CB0C-11d0-B5C9-00A0244A0E7A),
pointer_default(unique)
]
interface IdebugStackFrameSnifferEx:IDe-
    bugStackFrameSniffer
{
// Returns an enumerator of stack frames for the current
    thread.
// dwSpMin is the minimum address to begin enumerating
    stack frames
// Stack frames before this address will be omitted from
    the enumeration.
// Top of stack should be returned first (the most recently
    pushed frame).
HRESULT EnumStackFramesEx( [in] DWORD
    dwSpMin, [out]
IenumDebugStackFrames **ppedsf);
};
IDebugSyncOperation
    Implemented by a language engine to expose expression
evaluation.
[
object,
uuid(51973C1a-CB0C-11d0-B5C9-00A0244A0E7A),
pointer_default(unique),
local
]
interface IDebugSyncOperation : IUnknown
{
// Get TargetThread is called by PDM to determine what
    thread
// to call Evaluate() in
HRESULT GetTargetThread(
[out] IdebugApplicationThread **ppatTarget);
// Execute is called synchronously by the PDM in the
    target thread. It
// synchronously peforms the operation and returns. It
    returns E_ABORT if
// the operation was aborted with InProgressAbort();
HRESULT Execute(
[out]IUnknown **ppunkResult);
// InProgressAbort() is called by the PDM, from within
    the debugger thread,
// to cancel an operation which is in progress in another
    thread. The
// operation should be completed or error out with
    E_ABORT as soon as
// possible. E_NOTIMPL can be returned if the operation
    cannot be cancelled.
HRESULT InProgressAbort(void);
}
IDebugAsyncOperation
    Implemented by the PDM and obtained by the language
    engine
[
object,
uuid(51973C1b-CB0C-11d0-B5C9-00A0244A0E7A),
pointer_default(unique), local
]
interface IDebugAsyncOperation:IUnknown
HRESULT GetSyncDebugOperation(
[out] IDebugSyncOperation **ppsdo);
// Start() causes the asynchronous operation to begin. It
    asynchronously
// causes IDebugSyncOperation::Execute() to be called in
    the thread obtained
// from IDebugSyncOperation::GetTargetThread(). It
    should only
// be called from within the debugger thread, or it will not
    return until
// the operation is complete (it degenerates to
    synchronous).
// Returns E_UNEXPECTED if an operation is already
    pending.
HRESULT Start(IDebugAsyncOperationCallBack
    *padocb);
// Abort() causes InProgressAbort() to be called on the
    IDebugSyncOperation
// object. It is normally called from within the debugger
    thread to cancel
// a hung operation. If the abort happens before the request
    completes,
// GetResult() will return E_ABORT. E_NOTIMPL may
    be returned from this
// function if the operation is not cancellable.
HRESULT Abort(void);
// QueryIsComplete() returns S_OK if the operation is
    complete; otherwise it
// returns S_FALSE;
HRESULT QueryIsComplete(void);
// If the request is complete, returns the HRESULT and
    object parameter
```

```
// returned from IDebugSyncOperation::Execute().
   Otherwise, returns
// E_PENDING.
RESULT GetResult(
[out] HRESULT *phrResult,
[out] IUnknown **ppunkResult);
}
```
IDebugAsyncOperationCallBack
Used to signal events from an IdebugAsyncOperation.
```
[
object,
uuid(51973C1c-CB0C-11d0-B5C9-00A0244A0E7A),
pointer_default(unique), local
]
interface IDebugAsyncOperationCallBack : IUnknown
{
// onComplete() is fired by the AsyncDebugOperation
   when a result is available.
// The event is fired in the debugger thread.
HRESULT onComplete(void);
}
```
IEnumDebugCodeContexts
Used to enumerate the conde contexts corresponding to a document context.
```
[
object,
uuid(51973C1d-CB0C-11d0-B5C9-00A0244A0E7A),
helpstring("IEnumDebugCodeContexts Interface"),
pointer_default(unique)
]
interface IEnumDebugCodeContexts : IUnknown {
[local]
HRESULT _stdcall Next(
[in] ULONG celt,
[out] IdebugCodeContext **pscc,
[out] ULONG *pceItFetched);
HRESULT Skip(
[in] ULONG celt);
HRESULT Reset(void);
HRESULT Clone(
[out] IenumDebugCodeContexts **ppescc);
}
```
DebugStackFrameDescriptor Used to enumerate stack frames and merge output from several enumerators (on the same thread). dwMin and dwLim provide a machine dependent representation of the range of physical addresses associated with this stack frame. This is used by the process debug manager to sort the stack frames from multiple script engines.

By convention, stacks grow down and, as such, on architectures where stacks grow up the addresses should be twos-complemented. The punkFinal is used during enumerator merging. If punkFinal is non-null, It indicates that the that the current enumerator merging should stop and a new one should be started. The object indicates how the new enumeration is to be started.
```
   typedef struct tagDebugStackFrameDescriptor
   {
   IDebugStackFrame *pdsf;
   DWORD dwMin;
   DWORD dwLim;
   BOOL fFinal;
   IUnknown *punkFinal;
   } DebugStackFrameDescriptor;
```
IEnumDebugStackFrames
Used to enumerate the stack frames corresponding to a thread.
```
[
object,
uuid(51973C1e-CB0C-11d0-B5C9-00A0244A0E7A),
helpstring("IEnumDebugStackFrames Interface"),
pointer_default(unique)
]
interface IEnumDebugStackFrames:IUnknown
{
[local]
HRESULT _stdcall Next(
[in] ULONG celt,
[out] DebugStackFrameDescriptor *prgdsfd,
[out] ULONG *pceItFetched);
HRESULT Skip(
[in] ULONG celt);
HRESULT Reset(void);
HRESULT Clone( [out] IEnumDebugStackFrames
   **ppedsf);
}
```
Smart Host Interfaces Below are th edetails of the inerfaces implemented by a smart host. As mentioned earlier, it is possible to avoid implementing these interfaces by using the smart host helper interfaces.

DebugDocumentInfo

Provides information on a document, which may or may not be instantiated.
```
[
object,
uuid(51973C1f-CB0C-11d0-B5C9-00A0244A0E7A),
helpstring("IDebugDocumentInfo Interface"),
pointer_default(unique)
]
interface IDebugDocumentInfo : IUnknown {
// Returns the specified name for the document. If the
   indicated name is
// not known, E_FAIL is returned.
HRESULT GetName(
[in] DOCUMENTNAMETYPE dnt,
[out] BSTR *pbstrName);
// Returns a CLSID describing the document type. This
   allows the debugger IDE
// to host custom viewers for this document. returns
   CLSID_NULL if this document
// does not have viewable data.
HRESULT GetDocumentClassid(
[out] CLSID *pclsidDocument);
}
```
IDebugDocumentProvider Provides the means for instantiating a document on demand. This indirect means for instanciating a document:

1. Allows lazy loading of the document.

2. Allows the document object to live at the debugger IDE.

3. Allows more then one way of getting to the identical document object.

This effectively segregates the document from its provider; this allows the provider to carry additional runtime context information.

```
[
object,
uuid(51973C20-CB0C-11d0-B5C9-00A0244A0E7A),
helpstring("IDebug DocumentProvider Interface"),
pointer_default(unique)
]
interface IDebugDocumentProvider : IDebugDocumentInfo {
// Causes the document to be instantiated if it does not already exist.
HRESULT GetDocument(
[out] IdebugDocument **ppssd);
}
```

IDebugDocument

```
[
object,
uuid(51973C21-CB0C-11d0-B5C9-00A0244A0E7A),
pointer_default(unique)
]
interface IDebugDocument : IDebugDocumentinfo {}
```

IDebugDocumentText

The interface to a text only debug document.

Conventions:

1. Both character positions and line numbers are zero based.

2. Character-positions represent character offsets; they do not represent byte or word offsets. For Win32, a character-position is an Unicode offset.

Note: the use of line-number based text management is not recommended; instead it is recommended that character-position based management be used. The line to character-position mapping functions described in this interface may be removed.

```
[
object,
uuid(51973C22-CB0C-11d0-B5C9-00A0244A0E7A),
pointer_default(unique)
interface IDebugDocumentText : IDebugDocument {
// Returns the attributes of the document.
HRESULT GetDocumentAftributes(
[out]TEXT_DOC_ATTR *ptextdocattr);
// Returns the size of the document.
HRESULT GetSize(
[out] ULONG *pcNumLines, // NULL means do not return the number of lines.
[out] ULONG *pcNumChars); // NULL means do not return the number of characters.
// Returns character-position corresponding to the first character of a line.
HRESULT GetPositionOfLine(
[in] ULONG cLineNumber,
[out] ULONG *pcCharacterPosition);
// Returns the line-number and, optionally, the character offset within the line
// that corresponds to the given character-position.
HRESULT GetLineOfPosition(
[in] ULONG cCharacterPosition,
[out] ULONG *pcLineNumber,
[out] ULONG *pcCharacterOffsetInLine); // NULL means do not return a value.
// Retrieves the characters and/or the character attributes associated with
// a character-position range; where a character position range is specified by
// a character-position and a number of characters.
HRESULT GetText(
[in] ULONG cCharacterPosition,
// Specifies a character text buffer. NULL means do not return characters.
[in, out, length_is(*pcNumChars), size_is(cMaxChars)] WCHAR *pcharText,
// Specifies a character attribute buffer. NULL means do not return attributes.
[in, out, length_is(*pcNumChars), size_is(cMaxChars), ptr]
SOURCE_TEXT_ATTR *pstaTextAftr,
// Indicates the actual number of characters/attributes returned. Must be set to zero
// before the call.
[in, out] ULONG *pcNumChars,
// Specifies the number maximum number of character desired.
[in] ULONG cMaxChars);
// Returns the character-position range corresponding to a document context. The document
// context provided must be associated with this document.
HRESULT GetPositionOfContext(
[in] IDebugDocumentContext *psc,
[out] ULONG *pcCharacterPosition,
[out]ULONG *cNumChars);
// Creates a document context object corresponding to the provided character position range.
HRESULT GetContextOfPosition(
[in] ULONG cCharacterPosition,
[in] ULONG cNumChars,
[out] IDebugDocumentContext **ppsc);
}
```

IDebugDocumentTextEvents

Provides events indicating changes to the associated text document. Note: The text alterations are reflected in the document at the time the events on this interface are fired. Event handlers may retrieve the new text using IDebugDocumentText.

```
[
object,
uuid(51973C23-CB0C-11d0-B5C9-00A0244A0E7A),
pointer_default(unique)
]
interface IDebugDocumentTextEvents : IUnknown
{
// Indicates that the underlying document has been destroyed and is no longer valid.
HRESULT onDestroy(void);
```

```
// Indicates that new text has been added to the document.
    Example: progressive
loading
// of HTML.
//
HRESULT onInsertText(
// The position where the new text is inserted.
[in] ULONG cCharacterPosition,
// The number of characters that have been inserted.
[in] ULONG cNumToInsert);
// Indicates that text has been removed from the document.
HRESULT onRemoveText(
// The character-position of the first character removed.
[in] ULONG cCharacterPosition,
// The number of characters removed.
[in] ULONG cNumToRemove);
// Indicates that text has been replaced.
HRESULT onReplaceText(
// The starting character-position of the character-position range
// that is being replaced.
[in] ULONG cCharacterPosition,
// The number of characters replaced.
[in] ULONG cNumToReplace);
// Indicates that the text attributes associated with the underlying character-position
// range has changed.
HRESULT onUpdateTextAttributes(
// The character-position of the first character whose attributes have changed.
[in] ULONG cCharacterPosition,
// The number of characters in the range.
[in] ULONG cNumToUpdate);
// Indicates that the document attributes have changed.
HRESULT on UpdateDocumentAttributes(
// The new document attributes.
[in] TEXT_DOC_ATTR textdocattr);
}
```

IDebugDocumentHelper

IDebugDocumentHelper greatly simplifies the task of creating a smart host for ActiveDebugging. IDebugDocumentHelper automatically provides implementations for IDebugDocumentProvider, IDdebugDocument, IDebugDocumentText, IDebugDocumentContext, IDebugDocumentTextEvents, and many of the other interfaces necessary for smart hosting. To be a smart host using IDebugDocumentHelper, a host application only to do only three two things:

(1) CoCreate an IProcessDebugManager and use it to add your application to the list of debuggable applications.

(2) create an IDebugDocumentHelper for each host document and make the appropriate calls to define the document name, parent document, text, and script blocks.

(3) Implement IActiveScriptSiteDebug on your IActiveScriptSite object (implemented already for Active Scripting. The only non-trivial method on IActiveScriptSiteDebug simply delegates to the helper.

Additionally, the host can optionally implement IDebugDocumentHost if it needs additional control over syntax color, document context creation, and other extended functionality.

The main limitation on the smart host helper is that can only handle documents whose contents change or shrink after they have been added. For many smart hosts, however, the functionality it provides is exactly what is needed. Below we go into each of the steps in more detail.

Create an Application Object

Before the smart host helper can be used, it is necessary to create an IDebugApplication object to represent your application in the debugger. The steps for creating an application object are as follows:

(1) Create an instance of the process debug manager using CoCreatelnstance.

(2) Call IProcessDebugManager::CreateApplication().

(3) Set the name on the application using SetName().

(4) Add the application object to the list of debuggable applications using AddApplication().

Below is code to do this, minus error-check and other niceties.

```
CoCreatelnstance(CLSID_ProcessDebugManager,
    NULL,
    CLSCTX_INPROC_SERVER |CLSCTX_INPROC_HANDLER|
    CLSCTX_LOCAL_SERVER,
    IID_IProcessDebugManager, (void **)&g_ppdm);
g_ppdm->CreateApplication(&g_pda);
g_pda->SetName(L"My cool application");
g_ppdm->AddApplication(g_pda, &g_dwAppCookie);
```

Using IDebugDocumentHelper

The minimal sequence of steps for using the helper is as follows:

(1) For each host document, create a helper using IprocessDebugManager:: CreateDebugDocumentHelper.

(2) Call Init on the helper, giving the name, document attributes, etc.

(3) Call Attach with parent helper for the document (or NULL if the document is the root) to define the position of the document in the tree and make it visible to the debugger (4) Call AddDBCSText() or AddUnicodeText() to define the text of the document. These can be called multiple times if document is downloaded incrementally, as in the case of a browser.

(5) Call DefineScriptBlock to define the ranges for each script block and the associated script engines.

Implementing IActiveScriptSiteDebug

To implement GetDocumentContextFromPosition, get the helper corresponding to the given site, then get the starting document offset for the given source context, as follows:

pddh->GetScriptBlockInfo(dwSourceContext, NULL, &ulStartPos, NULL); Next, use the helper to create a new document context for the given character offset:

pddh->CreateDebugDocumentContext(ulStartPos+uCharacterOffset, cChars, &pddcNew);

To implement GetRootApplicationNode, simply call IDebugApplication::GetRootNode. To implement GetDebugApplication, simply return the IDebugApplication you initially created using the process debug manager.

The optional IDebugDocumentHost interface

The host can provide an implementation of IDebugDocumentHost using IDebugDocumentHelper::SetHost that gives it additional control over the helper. Here are some of the key things the host interface allows you to do:

(1) Add text using AddDeferredText so that the host doesn't have to provide the actual characters immediately. When the characters are really needed, the helper will call IDebugDocumentHost::GetDeferredCharacters on the host.

(2) Override the default syntax coloring provided by the helper. The helper will call IDebugDocumentHost::GetScriptTextAttributes when it needs to know the coloring for a range of characters, falling back on its default implementation if the host return E_NOTIMPL.

(3) Providing a controlling unknown for document contexts created by the helper my implementing IDebugDocumentHost::OnCreateDocumentContext. This allows the host to override the functionality of the default document context implementation.

(4) Provide a path name in the file system for the document. Some debugging Uls will use this to permit the user to edit and save changes to the document. IDebugDocumentHost::NotifyChanged will be called to notify the host after the document has been saved.

```
[
object,
uuid(51973C26-CB0C-11d0-B5C9-00A0244A0E7A),
helpstring("IDebugDocumentHelper Interface"),
pointer_default(unique)
interface IDebugDocumentHelper:IUnknown
{
// Initialize a debug doc helper with the given name and
// initial attributes.
// Note: The document will not actually appear in the tree
// until Attach is called.
HRESULT Init(
[in] IDebugApplication *pda,
[in, string]LPCOLESTR pszShortName,
[in, string]LPCOLESTR pszLongName,
[in]TEXT_DOC_ATTR docAttr );
// Add the document to the doc tree, using pddhParent as
   the parent.
// If the ppdhParent is NULL, the document will be
   top-level.
HRESULT Attach([in] IdebugDocumentHelper
   *pddhParent);
// Remove the document from the doc tree.
HRESULT Detach();
// Add the given set of unicode characters to end of the
   document to generate
// IDebugDocumentTextEvent notifications.
// If this method is called after AddDeferredText has been
   called,
// E_FAIL will be returned.
HRESULT AddUnicodeText( [in, string] LPCOLESTR
   pszText );
// Add the given set of DBCS characters to end of the
   document.
// (This will generate IDebugDocumentTextEvent
   notifications.)
// If this method is called after AddDeferredText has been
   called,
// E_FAIL will be returned.
HRESULT AddDBCSText(
[in, string] LPCSTR pszText
);
// Set the DebugDocumentHost interface.
// If provided, this interface will be used for
// smart-host syntax coloring, fetching deferred text, and
   returning
// controlling unknowns for newly created document
   contexts.
HRESULT SetDebugDocumentHost(
[in] IdebugDocumentHost * pddh );
// Notify the helper that the given text is available, but
   don't actually provide the characters
// This allows the host to defer providing the characters
   unless they are actually needed,
// while still allowing the helper to generate accurate
   notifications and size information.
// dwTextStartCookie is a cookie, defined by the host, that
   represents the starting
// position of the text. For example, in a host that represents text in DBCS, the cookie
// could be a byte offset. This cookie will be provided in
   subsequent calls to GetText.
// NB: It is assumed that a single call to GetText can get
   characters from multiple calls
// to AddDeferredText. The helper classes may also ask
   for the same range of deferred
// characters more than once. It is an error to mix calls to
   AddDeferredText with calls to
// AddUnicodeText or AddDBCSText—Doing so will
   cause E_FAIL to be returned.
HRESULT AddDeferredText(
[in] ULONG cChars,// number of (Unicode) characters to
   add
[in] DWORD dwTextStartCookie
// host-defined cookie representing the starting position of
   the text.
// Notify the helper that a particular range of characters is
   a script block handled by
// the given script engine. All syntax coloring and code
   context lookups for that
// range will be delegated to that script engine. This
   method would be used by a smart host whose documents contained embedded script blocks, or by a language
// engine containing embedded scripts for other languages. DefineScriptBlock should
// be called after the text has been added (via
   AddDBCSText, etc) but before the
// script script block has been parsed (via
   IActiveScriptParse).
HRESULT DefineScriptBlock(
[in] ULONG ulCharOffset,
[in] ULONG cChars,
[in] IActiveScript* pas,
[in] BOOL fScriptlet,
[out] DWORD* pdwSourceContext );
// Set the default attribute to use for text that is not in a
   script block. If not explicitly
```

```
// set, the default attributes for text outside of a script
    block is
// OURCETEXT_ATTR_NONSOURCE. This would
    allow, for example, for text
// outside of script blocks to be colored grey and marked
    read-only.
HRESULT SetDefaultTextAftr(SOURCE_TEXT_
    ATTR staTextAttr);
// Explicilty set the attributes on a range of text, overriding
    any other attributes
// on that text. It is an error to set the attributes on a text
    range that has not
// yet been added using AddText.
HRESULT SetTextAftributes(
[in] ULONG ulCharOffset,
[in] ULONG cChars,
[in, length_is(cChars), size_is(cChars)]
SOURCE_TEXT_ATTR* pstaTextAttr);
// Set a new long name for the document
HRESULT SetLongName(
[in, string] LPCOLESTR pszLongName);
// Set a new short name for the document
HRESULT SetShortName(
[in, string] LPCOLESTR pszShortName);
// Define a new set of document attributes
HRESULT SetDocumentAftr(
[in] TEXT DOC_ATTR pszAttributes );
// Return the debug application node corresponding to this
    document
HRESULT GetDebugApplicationNode(
[out] IdebugApplicationNode **ppdan);
// Once a script block has been defined, this method
    allows the
// associate range and script engine to be retrieved.
HRESULT GetScriptBlockinfo(
[in] DWORD dwSourceContext,
[out]IActiveScript** ppasd,
[out] ULONG ;hu *piCharPos,
[out]ULONG *pcChars);
// Allows the host to create a new debug document context
HRESULT CreateDebugDocumentContext(
[in]ULONG iCharPos,
[in]ULONG cChars,
[out] IdebugDocumentContext ** ppddc);
// Bring this document to the top in the debugger UI.
// If the debugger isn't started already, start it now.
HRESULT BringDocumentToTop();
// Bring the given context in this document to the top in
    the debugger Ul.
HRESULT    BringDocumentContextToTop
    (IDebugDocumentContext *pddc);
};
IDebugDocumentHost
    The interface from the IdebugDocumentHelper back to
the smart host or language engine. This interface exposes
hast specific functionality such as syntax coloring.
[
object,
uuid(51973C27-CB0C-11d0-B5C9-00A0244A0E7A),
helpstring("IDebugDocumentHost Interface"),
pointer_default(unique)
]
interface IDebugDocumentHost:IUnknown
{
// Return a particular range of characters in the original
    host document,
// added using AddDeferredText.
//
// It is acceptable for a host to return E_NOTIMPL for
    this method,
// as long as the host doesn't call AddDeferredText.
// (Note that this is text from the_original_document.
    The host
// does not need to be responsible for keeping track of
    edits, etc.)
HRESULT GetDeferredText(
[in] DWORD dwTextStartCookie,
// Specifies a character text buffer. NULL means do not
    return characters.
[in, out, length_is(*pcNumChars), size_is(cMaxChars)]
    WCHAR *pcharText,
// Specifies a character attribute buffer. NULL means do
    not return attributes.
[in, out, length_is(*pcNumChars), size_is(cMaxChars)]
    SOURCE_TEXT_ATTR
*pstaTextAttr,
// Indicates the actual number of characters/attributes
    returned. Must be set to zero
// before the call.
[in, out] ULONG *pcNumChars,
// Specifies the number maximum number of character
    desired.
[in] ULONG cMaxChars);
// Return the text attributes for an arbitrary block of
    document text.
// It is acceptable for hosts to return E_NOTIMPL, in
    which case the
// default attributes are used.
HRESULT GetScriptTextAtnributes(
// The script block text. This string need not be null
    terminated.
[in, size_is(uNumCodeChars)]LPCOLESTRpstrCode,
// The number of characters in the script block text.
[in]ULONGuNumCodeChars,
// See IActiveScriptParse::ParseScriptText for a descrip-
    tion of this argument.
[in]LPCOLESTRpstrDelimiter,
// See IActiveScriptParse::ParseScriptText for a descrip-
    tion of this argument.
[in]DWORDdwFlags,
// Buffer to contain the returned attributes.
[in, out, size_is(u NumCodeChars)]SOURCE_TEXT_
    ATTR *pattr);
// Notify the host that a new document context is being
    created and allow the host
// to optionally return a controlling unknown for the new
    context.
//
```

```
// This allows the host to add new functionality to the
    helper-provided document
// contexts. It is acceptable for the host to return
    E_NOTIMPL or a null outer
// unknown for this method, in which case the context is
    used "as is".
HRESULT OnCreateDocumentContext(
[out] IUnknown** ppunkouter);
// Return the full path (including file name) to the docu-
    ment's source file.
//*pfIsOriginalPath is TRUE if the path refers to the
    original file for the document.
//*pfIsOriginalPath is FALSE if the path refers to a newly
    created temporary file
//Returns E_FAIL if no source file can be created/
    determined.
HRESULT GetPathName(
[out] BSTR *pbstrLongName,
[out] BOOL *pfIsOriginalFile);
// Return just the name of the document, with no path
    information.
// (Used for "Save As . . . ")
HRESULT GetFileName(
[out] BSTR *pbstrShortName);
// Notify the host that the document's source file has been
    saved and
// that its contents should be refreshed.
HRESULT NotifyChanged();
);
IDebugDocumentContext
[
object,
uuid(51973C28-CB0C-11d0-B5C9-00A0244A0E7A),
pointer_default(unique)
]
interface IDebugDocumentContext:IUnknown
{
// Returns the document that contains this context.
HRESULT GetDocument(
[out] IDebugDocument **ppsd);
// Enumerates the code contexts associated with this
    document context. Generally
// there will only be one code context but there are
    important exceptions, such as
// include file or templates (in C++).
HRESULT EnumCodeContexts(
[out] IEnumDebugCodeContexts **ppescc);
}
Debugger UI interfaces
Below are the interfaces that allow other components to
launch and interface with the debugger UI.
IDebugSessionProvider
    The primary interface provided by a debugger IDE to
enable host and language initiated debugging. Its sole pur-
pose is to establish a debug session for a running application.
    cpp_quote( "EXTERN_C const CLSID CLSID_
DefaultDebugSessionProvider;")
    [
    object,
    uuid(51973C29-CB0C-11d0-B5C9-00A0244A0E7A),
    helpstring("IDebugSessionProvider Interface"),
    pointer_default(unique)
    ]
    interface IDebugSessionProvider:IUnknown
    {
    // Initiates a debug session with the specified application.
        The debugger should
    // call IRemoteDebugApplication::ConnectDebugger
        before returning from this call.
    HRESULT StartDebugSession(
    [in] Iremote DebugApplication *pda);
    }
IApplicationDebugger
    This is the primary interface exposed by a debugger IDE.
    [
    object,
    uuid(51973C2a-CB0C-11d0-B5C9-00A0244A0E7A),
    helpstring("IApplicationDebugger Interface"),
    pointer_default(unique)
    ]
    interface IApplicationDebugger:IUnknown
    {
    // indicates if the debugger is alive. Should always return
        S_OK. If the debugger
    // has rudely shut down COM will return an error from the
        marshalling proxy.
    HRESULT QueryAlive(void);
    // Provides a mechanism for hosts and language engines
        running out-of-process to the
    // debugger to create objects in the debugger process. This
        can be used for any purpose,
    // including extending the debugger Ul. This method
        simply delegates to CoCreatelnstance.
    HRESULT CreateInstanceAtDebugger(
    [in]REFCLSID rclsid,// Class identifier (CLSID) of the
        object
    [in]IUnknown *pUnkOuter,// Object is or isn't part of an
        aggregate
    [in]DWORD dwClsContext,// Context for running
        executable code
    [in]REF//D riid,// Interface identifier
    [out, iid_is(riid)]IUnknown **ppvObject);
    // Points to requested interface pointer. This method is
        called when IdebugApplication ::
    // DebugOutput is called. The debugger can use this to
        display the string in an output
    // window.
    HRESULT onDebugOutput(
    [in] LPCOLESTR pstr);
    // This method is called when a breakpoint is hit. The
        application will remain
    // suspended until the debugger IDE calls
    IDebugApplication::ResumeFromBreakPoint.
    HRESULT onHandleBreakPoint(
    // Indicates the thread in which the breakpoint occured.
    [in] IremoteDebugApplicationThread *prpt,
    // Indicates the reason for the breakpoint.
    [in]BREAKREASON br,
    // optional runtime error info (for when br==
        BREAKREASON_ERROR)
```

```
[in] IactiveScriptErrorDebug *pError);
// This method is called when IDebugApplication::Close
    is called.
HRESULT onClose(void);
// Handle a custom event.
// The semantics of the GUID and IUnknown are entirely
    application/debugger defined
// This method may return E_NOTIMPL.
HRESULT onDebuggerEvent(
[in]REF//D riid,
[in]IUnknown *punk);
};
IApplicationDebuggerUI
    This is a secondary interface exposed by some debugger
        IDE that allows an external component to have addi-
        tional control over the debuggers Ul.
    [
    object,
    uuid(51973C2b-CB0C-11d--B5C9-00A0244A0E7A),
    helpstring("IApplicationDebuggerUI Interface"),
    pointer_default(unique)
    ]interface IApplicationDebuggerUI:IUnknown
    {
    // Bring the window corresponding to the given debug
        document to the front.
    // Returns E_INVALIDARG if the document is not
        known.
    HRESULT BringDocumentToTop([in] IdebugDocument-
        Text * pddt);
    // Bring the window containing the given doc context to
        the front,
    // and scroll it to the correct location.
    // Returns E_INVALIDARG if the context is not known.
    HRESULT BringDocumentContextToTop([in] Idebug-
        DocumentContext * pddc);
    };
IMachineDebugManager
    The primary interface to the Machine Debug Manager.
    cpp_quote("EXTERN_C const CLSID CLSID_
        MachineDebugManager;")
    [
    object,
    uuid(51973C2c-CB0C-11d0-B5C9-00A0244A0E7A),
    helpstring("IMachineDebugManager Interface"),
    pointer_default(unique)
    ]
    interface IMachineDebugManager : IUnknown
    {
    // Adds an application to the running application list. This
        method is called by the
    // process debug manager whenever IProcessDebugMan-
        ager::AddApplication is called.
    HRESULT AddApplication(
    [in] IremoteDebugApplication *pda,
    [out] DWORD *pdwAppCookie);
    // Removes an application from the running application
        list. This method is called by the
    // process debug manager whenever
    IProcessDebugManager::RemoveApplication is called.
    HRESULT RemoveApplication(
    [in] DWORD dwAppCookie);
    // Returns an enumerator of the current list of running
        applications. Used by the debugger
    // IDE to display and attach applications for debugging
        purposes.
    HRESULT EnumApplications(
    [out] IenumRemoteDebugApplications **ppeda);
    };
IMachineDebugManagerCookie
    [
    object,
    uuid(51973C2d-CB0C-11d0-B5C9-00A0244A0E7A),
    helpstring("IMachineDebugManagerCookie Interface"),
    pointer_default(unique)
    ]
    interface IMachineDebugManagerCookie:IUnknown
    {
    // Adds an application to the running application list. This
        method is called by the
    // process debug manager whenever IProcessDebugMan-
        ager::AddApplication is called.
    HRESULT AddApplication(
    [in] IRemoteDebugApplication *pda,
    [in] DWORD dwDebugAppCookie,
    [out] DWORD *pdwAppCookie);
    // Removes an application from the running application
        list. This method is called by the
    // process debug manager whenever
    IProcessDebugManager::RemoveApplication is called.
    HRESULT RemoveApplication(
    [in] DWORD dwDebugAppCookie,
    [in] DWORD dwAppCookie);
    // Returns an enumerator of the current list of running
        applications. Used by the debugger
    // IDE to display and attach applications for debugging
        purposes.
    HRESULT EnumApplications(
    [out] IEnumRemoteDebugApplications **ppeda);
    };
ImachineDebugManagerEvents
    This event interface is used to signal changes in the
    running application list maintained by the machine debug
    manager. It can be used by the debugger IDE to display a
    dynamic list of applications.
    [
    object,
    uuid(51973C2e-CB0C-11d0-B5C9-00A0244A0E7A),
    helpstring("IMachineDebugManagerEvents Interface"),
    pointer_default(unique)
    ]
    interface IMachineDebugManagerEvents : IUnknown
    {
    // Indicates that a new application has appeared on the
        running application list.
    HRESULT onAddApplication(
    [in] IRemoteDebugApplication *pda,
    [in] DWORD dwAppCookie);
    // Indicates that an application has been removed from the
        running application list.
```

```
HRESULT onRemoveApplication(
  [in] IRemoteDebugApplication *pda,
  [in] DWORD dwAppCookie);
};
```
Process Debug Manager Interfaces
IProcessDebugManager
  The primary interface to the process debug manager.
  cpp_quote("EXTERN_C const CLSID CLSID_ProcessDebugManager;")
```
[
object,
uuid(51973C2f-CB0C-11d0-B5C9-00A0244A0E7A),
helpstring("IProcessDebugManager Interface"),
pointer_default(unique), local
]
interface IProcessDebugManager:IUnknown
{
  // Creates a new debug application object. The new object is not added to the
  // running application list and has no name.
  HRESULT CreateApplication(
    [out] IDebugApplication **ppda);
  // Returns a default application object for the current process, creating one and adding
  it to the running application list if necessary. Language engines should use this
  // application if they are running on a host that does not provide an application.
  HRESULT GetDefaultApplication(
    [out] IDebugApplication **ppda);
  // Adds an application to the running application list in the machine debug manager.
  HRESULT AddApplication(
    [in] IDebugApplication *pda,
    // Returns a cookie used to remove the application from the machine debug manager.
    [out] DWORD *pdwAppCookie);
  // Removes an application from the running application list.
  HRESULT RemoveApplication(
    // The cookie provided by AddApplication.
    [in] DWORD dwAppCookie);
  HRESULT CreateDebugDocumentHelper(
    [in] IUnknown *punkOuter,
    [out] IdebugDocumentHelper ** pddh);
};
```
IRemoteDebugApplication
  An abstraction representing a running application. It need not correspond to an OS process. Applications are the smallest debuggable unit; that is, the debugger IDE normally targets an application for debugging.
  The application object is normally implemented by the Process Debug Manager.
```
[
object,
uuid(51973C30-CB0C-11d0-B5C9-00A0244A0E7A),
helpstring("IRemoteDebugApplication Interface"),
pointer_default(unique)
]
interface IRemoteDebugApplication : IUnknown
{
  // Continue an application which is currently in a breakpoint.
  HRESULT ResumeFromBreakPoint(
    // For stepping modes, the thread which is to be affected by the stepping mode.
    [in] I remoteDebugApplicationThread *prptFocus,
    // The action to take (step mode, etc.) upon resuming the application
    [in] BREAKRESUMEACTION bra,
    // the action to take in the case that we stopped because of an error
    [in] ERRORRESUMEACTION era);
  // Causes the application to break into the debugger at the earliest opportunity.
  Note
  // that a long time may elapse before the application actually breaks, particularly if
  // the application is not currently executing script code.
  HRESULT CauseBreak(void);
  // Connects a debugger to the application. Only one debugger may be connected at a
  // time; this method fails if there is already a debugger connected
  HRESULT ConnectDebugger(
    [in] IapplicationDebugger *pad);
  // Disconnects the current debugger from the application.
  HRESULT DisconnectDebugger(void);
  // Returns the current debugger connected to the application.
  HRESULT GetDebugger(
    [out] IapplicationDebugger **pad);
  // Provides a mechanism for the debugger IDE, running out-of-process to the
  // application, to create objects in the application process.
  // This method simply delegates to CoCreateInstance.
  HRESULT CreateInstanceAtApplication(
    [in] REFCLSID rclsid, // Class identifier (CLSID) of the object
    // Note: This parameter may have to be removed.
    [in]IUnknown *pUnkOuter, // Object is or isn't part of an aggregate
    [in]DWORD dwClsContext, // Context for running executable code
    [in]REF//D riid,// Interface identifier
    [out, iid_is(riid)]IUnknown **ppvObject);
  // Points to requested interface pointer
  // Indicates if the application is alive. Should always return S_OK. If the application
  // process has rudely shut down COM will return an error from the marshalling proxy.
  HRESULT QueryAlive(void);
  // Enumerates all threads known to be associated with the application.
  // New threads may be added at any time.
  HRESULT EnumThreads(
    [out] IenumRemoteDebugApplicationThreads **pperdat);
  // Returns the application node under which all nodes associated with the
```

```
// application are added.
HRESULT GetName(
[out]BSTR *pbstrName);
// Returns a node for the application
HRESULT GetRootNode(
[out] IDebugApplicationNode **ppdanRoot);
// Returns an enumerator that lists the global expression
// contexts for all languages running in this application
HRESULT EnumGlobalExpressionContexts (
[out] IenumDebugExpressionContexts **ppedec);
};
IDebugApplication
    This interface is an extension of
IremoteDebugApplication, exposing non-remotable methods for use by language engines and hosts.
[
object,
uuid(51973C32-CB0C-11d0-B5C9-00A0244A0E7A),
helpstring("IDebugApplication Interface"),
pointer_default(unique),
local
]
interface IDebugApplication : IRemoteDebugApplication
{
// Sets the name of the application that is returned in
    subsequent calls
// to IRemoteDebugApplication::GetName.
HRESULT SetName(
[in]LPCOLESTR pstrName);
// This method is called by language engines, in single
    step mode, just before they
// return to their caller. The process debug manager uses
    this opportunity to notify
// other script engines that they should break at the first
    opportunity. This is how
// cross language step modes are implemented.
HRESULT StepOutComplete(void);
// Causes the given string to be displayed by the debugger
    IDE, normally in an output
// window. This mechanism provides the means for a
    language engine to implement language
// specific debugging output support. Example:
    Debug.writeIn("Help") in Javascript.
HRESULT DebugOutput(
[in]LPCOLESTR pstr);
// Causes a default debugger IDE to be started and a debug
    session to be attached to
// this application if one does not already exist. This is
    used to implement just-in-time
// debugging.
HRESULT StartDebugSession(void);
// Called by the language engine in the context of a thread
    that has hit a breakpoint.
// This method causes the current thread to block and a
    notification of the breakpoint
// to be sent to the debugger IDE. When the debugger IDE
    resumes the application this
// method returns with the action to be taken.
//
// Note: While in the breakpoint the language engine may
    be called in this thread to do
// various things such as enumerating stack frames or
    evaluating expressions.
HRESULT HandleBreakPoint(
[in]BREAKREASON br,
[out]BREAKRESUMEACTION *pbra);
// Causes this application to release all references and
    enter a zombie state.
Called
// by the owner of the application generally on shut down.
HRESULT Close(void);
// Returns the current break flags for the application.
HRESULT GetBreakFlags(
[out]APPBREAKFLAGS *pabf,
[out]    IremoteDebugApplicationThread
    **pprdatSteppingThread);
// Returns the application thread object associated with the
    currently running thread.
HRESULT GetCurrentThread(
[out] IdebugApplicationThread **pat);
// Creates an IDebugAsyncOperation object to wrap a
    provided
IdebugSyncOperation
// object. This provides a mechanism for language engines
    to implement asynchronous
// expression and evaluation, etc. without having to know
    the details of
// synchronization with the debugger thread. See the
    descriptions for
// IDebugSyncOperation and IdebugAsyncOperation for
    more details.
HRESULT CreateAsyncDebugOperation(
[in) IdebugSyncOperation *psdo,
[out] IdebugAsyncOperation **ppado);
// Adds a stack frame sniffer to this application. Generally
    called by a language engine
// to expose its stack frames to the debugger. It is possible
    for other entities to
// expose stack frames.
HRESULT AddStackFrameSniffer(
[in] IdebugStackFrameSniffer *pdsfs,
// Returns a cookie that is used to remove this stack frame
    sniffer
// from the application.
[out]DWORD *pdwCookie);
// Removes a stack frame sniffer from this application.
HRESULT RemoveStackFrameSniffer(
// The cookie returned by AddStackFrameSniffer.
[in]DWORD dwCookie);
// Returns S_OK if the current running thread is the
    debugger thread.
// Otherwise, returns S_FALSE.
HRESULT QueryCurrentThreadIsDebuggerThread
    (void);
// Provides a mechanism for the caller to run code in the
    debugger thread. This is
// generally used so that language engines and hosts can
    implement free threaded
```

```
// objects on top of their single threaded implementations.
HRESULT SynchronousCallInDebuggerThread(
[in] IdebugThreadCall *pptc,
[in]DWORD dwParam1,
[in]DWORD dwParam2,
[in]DWORD dwParam3);
// Creates a new application node which is associated with a specific
// document provider. Before it is visible, the new node must be
// attached to a parent node.
HRESULT CreateApplicationNode(
[out] IdebugApplicationNode **ppdanNew);
// Fire a generic event to the IApplicationDebugger (if any)
// The semantics of the GUID and IUnknown are entirely application/debugger defined
// This method is currently unimplemented but is here to allow for future extensions.
HRESULT FireDebuggerEvent(
[in)REFGUID riid,
[in]IUnknown *punk);
// Called by the language engine in the context of a thread that has caused a runtime
// error. This method causes the current thread to block and a notification of the error
// to be sent to the debugger IDE. When the debugger IDE resumes the application this
// method returns with the action to be taken.
// Note: While in the runtime error the language engine may be called in this thread to do
// various things such as enumerating stack frames or evaluating expressions.
HRESULT HandleRuntimeError(
[in] IactiveScriptErrorDebug *pErrorDebug,// the error that occurred
[in]IActiveScriptSite *pScriptSite,// the script site of the thread
[out]BREAKRESUMEACTION *pbra,// how to continue execution (stepping etc . . . )
[out]ERRORRESUMEACTION *perra,// how to handle the error case
[out]BOOL *pfCallOnScriptError);// if TRUE then engine should call
IActiveScriptSite: OnScriptError()
// return TRUE if there is a JIT debugger registered
BOOL FCanJitDebug ();
// returns TRUE if a JIT debugger is registered to auto-JIT debug dumb hosts
BOOL FIsAutoJitDebugEnabled ();
// Adds a global expression context provider to this application
HRESULT AddGlobal ExpressionContextProvider(
[in] IprovideExpressionContexts *pdsfs,
// Returns a cookie that is used to remove this global expression context provider
// from the application.
[out]DWORD *pdwCookie);
// Removes a global expression context provider from this application.
HRESULT RemoveGlobalExpressionContextProvider(
// The cookie returned by AddGlobalExpressionContext-Provider.
[in]DWORD dwcookie);
};
IRemoteDebugApplicationEvents:
    This is the event interface supplied by a debug application: It is always called from within the debugger thread.
[
object,
uuid(51973C33-CB0C-11d0-B5C9-00A0244A0E7A),
helpstring("IRemoteDebugApplicationEvents Interface"),
pointer_default(unique)
]
interface IRemoteDebugApplicationEvents : IUnknown
{
HRESULT OnConnectDebugger(
[in] IapplicationDebugger *pad);
HRESULT OnDisconnectDebugger(void);
HRESULT OnSetName(
[in]LPCOLESTR pstrName);
HRESULT OnDebugOutput(
[in]LPCOLESTR pstr); H
RESULT OnClose(void);
HRESULT OnEnterBreakPoint(
[in] IremoteDebugApplicationThread *prdat);
HRESULT OnLeaveBreakPoint(
[in] IremoteDebugApplicationThread *prdat);
HRESULT OnCreateThread(
[in] IremoteDebugApplicationThread *prdat);
HRESULT OnDestroyThread(
[in] IremoteDebugApplicationThread *prdat);
HRESULT OnBreakFlagChange(
[in]APPBREAKFLAGS abf,
[in]IremoteDebugApplicationThread *prdatSteppingThread);
};
IDebugApplicationNode
    Provides the functionality of IdebugDocumentProvider, plus a context within a project tree.
[
object,
uuid(51973C34-CB0C-11d0-B5C9-00A0244A0E7A),
pointer_default(unique)
]
interface IDebugApplicationNode: IdebugDocumentProvider {
HRESULT EnumChildren(
[out] IenumDebugApplicationNodes **pperddp);
HRESULT GetParent(
[out] IdebugApplicationNode **pprddp);
HRESULT SetDocumentProvider(
[in] IdebugDocumentProvider *pddp);
HRESULT Close(void);
HRESULT Attach(
[in] IdebugApplication Node *pdan Parent);
HRESULT Detach(void);
```

IDebugApplicationNodeEvents
  Event interface for DebugApplicationNode object.
  [
  object,
  uuid(51973C35-CB0C-11d0-B5C9-00A0244A0E7A),
  pointer_default(unique)
  ]
  interface IDebugApplicationNodeEvents : IUnknown {
  HRESULT onAddChild(
  [in] IdebugApplicationNode *prddpChild);
  HRESULT onRemoveChild(
  [in] IdebugApplicationNode *prddpChild);
  HRESULT onDetach(void);
  RESULTonAttach(
  [in] IdebugApplicationNode *prddpParent);
  }
IDebugThreadCall
  IDebugThreadCall is implemented by a component making a cross-thread call using the IDebugThread marshalling implementation in the PDM. It is called by the PDM in the desired thread and should dispatches the call to the desired implementation, casting the parameter information passed in the dwParam's to the appropriate top. It is, of course, a free-threaded object.
  [
  object,
  uuid(51973C36-CB0C-11d0-B5C9-00A0244A0E7A),
  pointer_default(unique),
  local
  ]
  interface IDebugThreadCall:IUnknown
  {
  HRESULT ThreadCallHandler(
  [in] DWORD dwParam1,
  [in] DWORD dwParam2,
  [in] DWORD dwParam3);
  }
IRemoteDebugApplicationThread
  An abstaction representing a thread of execution within a particular application.
  [
  object,
  uuid(51973C37-CB0C-1d0-B5C9-00A0244A0E7A),
  pointer_default(unique)
  interface IRemoteDebugApplicationThread:IUnknown
  {
  // Returns an operating system dependent identifier associated with the thread.
  //
  // Note: The returned value does not need to be unique across machines.
  HRESULT GetSystemThreadId(
  [out]DWORD *dwThreadId);
  // Returns the application object associated with the thread.
  HRESULT GetApplication(
  [out] IremoteDebugApplication **pprda);
  // Returns an enumerator for the stack frames associated with the thread. Can only
  // be called when in a breakpoint. The stack frame enumerator enumerates stack frames
  // in the most recently called order.
  HRESULT EnumStackFrames(
  [out] IenumDebugStackFrames **ppedsf);
  HRESULT GetDescription(
  [out]BSTR *pbstrDescription,
  [out]BSTR *pbstrState);
  // Forces execution to continue as close as possible to the
  // given code context, in the context of the given frame.
  // Either of these arguments may be NULL, representing the
  // current frame or context.
  HRESULT SetNextStatement (
  [in] IdebugStackFrame *pStackFrame,
  [in] IdebugCodeContext *pCodeContext);
  // Thread State flags
  typedef DWORD THREAD_STATE;
  const THREAD_STATE THREAD_STATE_RUNNING=0x00000001;
  const THREAD_STATE THREAD_STATE_SUSPENDED=0x00000002;
  const THREAD_STATE THREAD_BLOCKED=0x00000004;
  const THREAD_STATE THREAD_OUT_OF_CONTEXT=0x00000008;
  // returns the current state of the thread HRESULT GetState (
  [out] DWORD *pState);
  // suspends the thread (increments the suspend count)
  HRESULT Suspend (
  [out] DWORD *pdwCount);
  // resumes the thread (decrements the suspend count)
  HRESULT Resume (
  [out] DWORD *pdwCount);
  // returns the current suspend count of the thread
  HRESULT GetSuspendCount (
  [out] DWORD *pdwCount);
  }
IDebugApplicationThread
  An extension of IRemoteDebugApplicationThread that provides non-remotable access to the thread. This interface is used by language engines and hosts to provide thread synchronization and to maintain thread specific debug state information.
  [
  object,
  uuid(51973C38-CB0C-11d0-B5C9-00A0244A0E7A),
  pointer_default(unique), local
  [
  interface IDebugApplicationThread : IremoteDebugApplicationThread
  {
  // Provides a mechanism for the caller to run'code in another thread. This is generally
  // used so that language engines and hosts can implement free threaded objects on top
  // of their single threaded implementations.
  HRESULT SynchronousCallIntoThread(

```
// The interface to be called back in the target thread.
[in] IdebugThreadCall *pstcb,
// Three arguments passed to the IDebugThreadCall.
[in]DWORD dwparam1,
[in]DWORD dwParam2,
[in]DWORD dwParam3);
// Returns S_OK when this is the currently running thread
    else S_FALSE is returned.
HRESULT QueryIsCurrentThread(void);
// Returns S_OK when this is the debugger thread.
    Otherwise, returns S_FALSE.
HRESULT QueryIsDebuggerThread(void);
HRESULT SetDescription(
[in]LPCOLESTR pstrDescription);
HRESULT SetStateString(
[in]LPCOLESTR pstrState);
}
]
object, local,
uuid(51973C39-CB0C-11d0-B5C9-00A0244A0E7A),
helpstring("IDebugCookie Interface"),
pointer_default(unique)
]
interface IDebugCookie : IUnknown
{
HRESULT   SetDebugCookie([in]DWORD
    dwDebugAppCookie);
};
IEnumDebugApplicationNodes
    Enumerates Application nodes. Generally used to enumerate child nodes of a node associated with an application. Example: a project window.
[
    object,
    uuid(51973C3a-CB0C-11d0-B5C9-00A0244A0E7A),
    helpstring("IEnumDebugApplicationNodes Interface"),
    pointer_default(unique)
]
interface IEnumDebugApplicationNodes : IUnknown {
[local]
HRESULT _stdcall Next(
[in] ULONG celt,
[out] IDebugApplicationNode **pprddp,
[out] ULONG *pceltFetched);
HRESULT Skip(
[in] ULONG celt);
HRESULT Reset(void);
HRESULT Clone(
[out] IEnumDebugApplicationNodes **pperddp);
};
IEnumRemoteDebugApplications
    Used to enumerate the running applications on a machine.
[
    object,
    uuid(51973C3b-CB0C-11d0-B5C9-00A0244A0E7A),
    helpstring("IEnumRemoteDebugApplications
        Interface"),
    pointer_default(unique)
]
interface IEnumRemoteDebugApplications : IUnknown {
[local)]
HRESULT _stdcall Next(
[in] ULONG celt,
[out] IRemoteDebugApplication **ppda,
[out] ULONG *pceltFetched);
HRESULT Skip(
[in] ULONG celt);
HRESULT Reset(void);
HRESULT Clone(
[out] IEnumRemoteDebugApplications **ppessd);
[
IEnumRemoteDebugApplicationThreads
    Used to enumerate the running threads in an application.
[
    object,
    uuid(51973C3c-CB0C-11d0-B5C9-00A0244A0E7A),
    helpstring("IEnumRemoteDebugApplicationThreads
        Interface"),
    pointer_default(unique)
]
interface IEnumRemoteDebugApplicationThreads : IUnknown {
[local]
HRESULT_stdcall Next(
[in] ULONG celt,
[out] IRemoteDebugApplicationThread **pprdat,
[out] ULONG *pceltFetched);
HRESULT Skip(
[in] ULONG celt);
HRESULT Reset(void);
HRESULT Clone(
[out] IEnumRemoteDebugApplicationThreads
    **pperdat);
}
IDebugFormatter
    IDebugFormatter allows a language or IDE to customize the conversion between variants or VARTYPES and strings. This interface is used by the ITypeInfo->IDebugProperty mapping implementation.
[
    object,
    uuid(51973C3d-CB0C-11d0-B5C9-00A0244A0E7A),
    helpstring("IDebug Formatter Interface"),
    pointer_default(unique),
    local
interface IDebugFormafter : IUnknown
{
HRESULT GetStringForVariant([in] VARIANT *pvar,
    [out] BSTR *pbstrValue);
HRESULT GetVariantForString([in] LPCOLESTR
    pwstrValue, [out] VARIANT *pvar);
HRESULT GetStringForVarType([in] VARTYPE vt, [in]
    TYPEDESC
    *ptdescArrayType, [out] BSTR *pbstr);
}
ISimpleConnectionPoint
    This interface is the "IDispatchEx" of event interfaces. It provides a simple way for describing and enumerating the
``` events fired on a particular connection pointan also for hooking up an IDispatch to those events. This interface will be available as extended info via the IDebugProperty interface on objects which support events. For simplicity, this interface only works with dispinterfaces.

```
[
object,
uuid(51973C3e-CB0C-11d0-B5C9-00A0244A0E7A),
helpstring("ISimpleConnectionPoint Interface"),
pointer_default(unique),
local
]
interface ISimpleConnectionPoint : IUnknown
{
// Return the number of events exposed on this interface
HRESULT GetEventCount([out] ULONG *pulCount);
// Return the DISPID and NAME for "cEvents" events,
    starting at "iEvent".
// The number of
//- Returns S_OK if all of the requested elements were
    returned.
//- Returns S_FALSE if the enumeration finished and the
//requested number of elements was not available.
//(Unavailable elements will be returned as DISPID_
    NULL and a null bstr.)
//- Returns E_INVALIDARG (or other error status) if no
    elements could be fetched
HRESULT DescribeEvents(
[in] ULONG iEvent,// starting event index
[in] ULONG cEvents,// number of events to fetch info for
[out, size_is(cEvents), length_is(*pcEventsFetched)]
DISPID *prgid,// DISPIDs of the events
[out, size_is(cEvents), length_is(*pcEventsFetched)]
BSTR *prgbstr,
[out] ULONG *pcEventsFetched
);// names of the events
HRESULT Advise([in] IDispatch *pdisp, [out] DWORD*
    pdwcookie);
HRESULT Unadvise([in] DWORD dwcookie);
};
```

IDebugHelper

Serves as a factory for object browers and simple connection points.

```
    cpp_quote( "EXTERN_C const CLSID CLSID_
        DebugHelper;")
[
object,
uuid(51973C3f-CB0C-11d0-B5C9-00A0244A0E7A),
helpstring("IDebugHelper Interface"),
pointer_default(unique),
local
]
interface IDebugHelper : IUnknown
{
// Returns a property browser that wraps a VARIANT
HRESULT CreatePropertyBrowser(
[in] VARIANT *pvar, // root variant to browse
[in] LPCOLESTR bstrName, // name to give the root
[in] IdebugApplicationThread *pdat, // thread to request
    properties on or NULL
[out] IDebugProperty**ppdob);
// Returns a property browser that wraps a VARIANT, and
    allows for custom conversion
// of variants or VARTYPEs to strings
HRESULT CreatePropertyBrowserEx(
[in] VARIANT *pvar,// root variant to browse
[in] LPCOLESTR bstrName,// name to give the root
[in] IdebugApplicationThread *pdat, // thread to request
    properties on or NULL
[in] IdebugFormatter *pdf,// provides custom formatting
    of variants
[out] IDebugProperty**ppdob);
// Returns an event interface that wraps the given IDispatch (see
ISimpleConnectionPoint)
HRESULT CreateSimpleConnectionPoint(
[in] IDispatch *pdisp,
[out] IsimpleConnectionPoint **ppscp);
}
```

IEnumDebugExpressionContexts

```
{
object,
uuid(51973C40-CB0C-11 d0-B5C9-00A0244A0E7A),
helpstring("IEnumDebugExpressionContexts Interface"),
pointer_default(unique)
]
interface IEnumDebugExpressionContexts : IUnknown
{
[local]
HRESULT _stdcall Next(
[in] ULONG celt,
[out] IdebugExpressionContext **ppdec,
[out] ULONG *pceltFetched);
HRESULT Skip(
[in] ULONG celt);
HRESULT Reset(void);
HRESULT Clone(
[out] IEnumDebugExpressionContexts **ppedec);
}
```

IProvideExpressionContexts

Provides a means for enumerating expression contexts known by a certain component. Generally implemented by each script engine. Used by the process debug manager to find all global expression contexts associated with a given thread. Note: This interface is called from within the thread of interest. It is up to the implementor to identify the current thread and return an appropriate enumerator.

```
[
object,
uuid(51973C41-CB0C-11d0-B5C9-00A0244A0E7A),
pointer_default(unique)
]
interface IProvideExpressionContexts : IUnknown
{
// Returns an enumerator of expression contexts.
HRESULT EnumExpressionContexts(
[out] IenumDebugExpressionContexts **ppedec);
}
```

```
[
uuid(78a51821-51f4-11d0-8f20-00805f2cd064),
version(1.0),
helpstring("ProcessDebugManagerLib 1.0 Type
    Library")
]
library ProcessDebugManagerLib
{
importlib("stdole2.tlb");
interface IActiveScriptDebug;
interface IActiveScriptErrorDebug;
interface IActiveScriptSiteDebug;
interface IApplicationDebugger;
interface IApplicationDebuggerUI;
interface IDebugApplication;
interface IDebugApplicationNode;
interface IDebugApplicationNodeEvents;
interface IDebugApplicationThread;
interface IDebugAsyncOperation;
interface IDebugAsyncOperationCallBack;
interface IDebugCodeContext;
interface IDebugCookie;
interface IDebugDocument;
interface IDebugDocumentContext;
interface IDebugDocumentHelper;
interface IDebugDocumentHost;
interface IDebugDocumentInfo;
interface IDebugDocumentProvider;
interface IDebugDocumentText;
interface IDebugDocumentTextAuthor;
interface IDebug DocumentTextEvents;
interface IDebugDocumentTextExternalAuthor;
interface IDebugExpression;
interface IDebugExpressionCallBack;
interface IDebugExpressionContext;
interface IDebugFormatter;
interface IDebugHelper;
interface IDebugSessionProvider;
interface IDebugStackFrame;
interface IDebugStackFrameSniffer;
interface IDebugStackFrameSnifferEx;
interface IDebugSyncOperation;
interface IDebugThreadCall;
interface IEnumDebugApplication Nodes;
interface IEnumDebugCodeContexts;
interface IEnumDebugExpressionContexts;
interface IEnumDebugStackFrames;
interface IEnumRemoteDebugApplications;
interface IEnumRemoteDebugApplicationThreads;
interface IMachineDebugManager;
interface IMachineDebugManagerCookie;
interface IMachineDebugManagerEvents;
interface IProcessDebugManager;
interface IProvideExpressionContexts;
interface IRemoteDebugApplication;
interface IRemoteDebugApplicationEvents;
interface IRemoteDebugApplicationThread;
interface ISimpleConnectionPoint;
[
uuid(78a51822-51f4-11d0-8f20-00805f2cd064),
helpstring("ProcessDebugManager Class")
]
coclass ProcessDebugManager
{[default] interface IProcessDebugManager; };
[
uuid(0BFCC060-8C1D-11d0-ACCD-00M0060275C),
helpstring("DebugHelper Class")
[
coclass DebugHelper
{
[default] interface IDebugHelper;
};
// CDebugDocumentHelper
//
// The CDebugDocumentHelper makes it much easier for
    an ActiveScripting
// host or scripting engine to implement the IDebugDocu-
    ment interfaces.
//
// Given the source text and (optionally) script blocks for
    a host's
// document, CDebugDocumentHelper provides imple-
    mentations for
// the debug document interfaces, including:
//
//- IDebugDocumentText
//- DebugDocumentTextAuthor (for authoring)
//- IDebugDocumentContext
//
// This class supports aggregation, so the host may provide
    a controlling
// unknown to CoCreateInstance for extensibility.
//
// This class fires events on IDebugDocumentTextEvents,
    so the host
// can monitor all changes to the document via that
    interface.
cpp_quote("EXTERN_C const CLSID CLSID_
    CDebugDocumentHelper;")
[
uuid(83B8BCA6-687C-11D0-A405-00M0060275C),
helpstring("DebugDocumentHelper Class")
]
coclass CDebugDocumentHelper
{
[default] interface IDebugDocumentHelper;
interface IDebugDocumentProvider;
interface IDebugDocument;
interface IDebugDocumentText;
interface IDebugDocumentTextAuthor;
interface IConnectionPointContainer;
[default, source] interface IDebugDocumentTextEvents;
};
};
```

What is claimed:

1. A method of operating an active debugging environment to debug a virtual application, said method comprising:

populating a script host with a script for a virtual application that assimilates plural script fragments for automating one or more objects of an object model provided through the script host, the plural script fragments including a first script fragment from a first language and a second script fragment from a second language;

dynamically activating said active debugging environment; and running said script by said script host under control of said active debugging environment in a manner comprising:

defining at least one event monitoring case by way of a debug user interface;

for each of said at least one event monitoring case, coordinating implementation in a language-dependent manner as appropriate for a script fragment in said script;

identifying an occurrence of each of said at least one event monitoring case; and activating a predefined response to said occurrence.

2. A method according to claim 1 wherein said populating includes:

dynamically establishing a language engine for each language represented in said virtual application.

3. A method according to claim 1 including:

supporting any one of a plurality of integrated development environment user interfaces to said active debugging environment in a language neutral and host independent manner.

4. A method according to claim 3 including:

transmitting any portion of said script to said supported integrated development environment user interface to facilitate source code and virtual application context viewing by said debug user; and receiving data from said integrated development environment user interface indicative of user-input commands to control operation of said active debugging environment.

5. A method according to claim 1 wherein said activating a predefined response includes:

generating a view of said script to a debug user that is relevant to said event; and dynamically altering said script by script edit facilities in an integrated development environment user interface.

6. A method according to claim 5 further including:

running said script on said script host with edited changes absent any run-time interruptions to said active debugging environment.

7. In a computer system, a method of operating an active debugging environment to debug as a virtual application plural scriptlets that automate the objects of an object model, the method comprising:

receiving plural scriptlets for automating one or more objects of an object model exposed through an Internet browser, the plural scriptlets including a first scriptlet written in a first scripting language and a second scriptlet written in a second scripting language;

defining an active debugging environment that is scripting language-neutral;

based upon the plural scriptlets and context information for the plural scriptlets, generating a virtual application;

based upon at least one scripting language-neutral script debugging case for the virtual application, directing scripting language-dependent execution of the plural scriptlets during automation of the one or more objects of the object model.

8. In a computer system in which code fragments automate objects provided through a host, an active environment that allows debugging the code fragments as a single debuggable entity, the active environment comprising:

an entity register that manages interaction between a debug user interface and one or more debuggable entities, each debuggable entity assimilating one or more code fragments, each code fragment written in one of plural languages, the debug user interface for accepting one or more debugging cases;

an entity-specific debug manager that coordinates language-dependent implementation of debugging cases for a particular debuggable entity during automation of objects provided through the host according to the one or more code fragments of the particular debuggable entity.

9. The active environment of claim 8 wherein the entity-specific debug manager communicates a first debugging case to a first language engine that implements the first debugging case according to a first language, and wherein the entity-specific debug manager communicates a second debugging case to a second language engine that implements the second debugging case according to a second language.

10. The active environment of claim 9 wherein the entity-specific debug manager coordinates breakpoints and stepping between the first and second language engines.

11. The active environment of claim 9 wherein the entity-specific debug manager merges stack frames for the first and second language engines.

12. The active environment of claim 8 wherein the particular debuggable entity is a default debuggable entity that assimilates one or more code fragments in a first language.

13. In a computer system in which aggregated script fragments automate scriptable objects provided through a host, the aggregated script fragments including one or more script fragments each written in one of plural scripting languages, a debugging user interface that facilitates debugging the aggregated script fragments, the debugging user interface comprising:

view producing means for presenting to a user a script view;

event setting means for defining one or more control points in the aggregated script fragments; and event communicating means for conveying the one or more control points to a debugging environment through which each of the one or more control points is implemented in a language-dependent manner suitable for the script fragment affected by the control point.

14. The debugging user interface of claim 13 further comprising:

editing means for dynamic script fragment modification during debugging.

15. A computer-readable medium storing instructions for performing a method of facilitating the debugging of aggregate code that automates one or more scriptable objects provided through a host, the method comprising:

providing an active debugging environment for interacting with a host that provides one or more scriptable objects capable of automation by an aggregate code that includes a first code fragment written in a first language and a second code fragment written in a second language;

recognizing a debuggable entity created from the aggregate code and context information;

based upon plural debug events for the debuggable entity, intervening in automation, wherein the active debugging environment coordinates implementation of a first debug event according to the first language, wherein the active debugging environment coordinates implementation of a second debug event according to the second language, and wherein the intervening in automation comprises:

communicating the first debug event to a first language engine that implements debug events in a first language-dependent manner; and communicating the second debug event to a second language engine that implements debug events in a second language-dependent manner.

16. A computer-readable medium storing instructions for performing a method of facilitating the debugging of aggregate code that automates one or more scriptable objects provided through a host, the method comprising:

providing an active debugging environment for interacting with a host that provides one or more scriptable objects capable of automation by an aggregate code that includes a first code fragment written in a first language and a second code fragment written in a second language, wherein the providing comprises:

providing an entity register for managing interaction between a debug user interface and one or more debuggable entities, the debug user interface for accepting and consistently defining debug event input for a particular one of the one or more debuggable entities; and providing an entity-specific debug manager for coordinating language-dependent debug event implementation;

recognizing a debuggable entity created from the aggregate code and context information;

based upon plural debug events for the debuggable entity, intervening in automation, wherein the active debugging environment coordinates implementation of a first debug event according to the first language, and wherein the active debugging environment coordinates implementation of a second debug event according to the second language.

17. A computer-readable medium storing instructions for performing a method of facilitating the debugging of aggregate code that automates one or more scriptable objects provided through a host, the method comprising:

providing an active debugging environment for interacting with a host that provides one or more scriptable objects capable of automation by an aggregate code that includes a first code fragment written in a first language and a second code fragment written in a second language, wherein the languages are scripting languages;

recognizing a debuggable entity created from the aggregate code and context information;

based upon plural debug events for the debuggable entity, intervening in automation, wherein the active debugging environment coordinates implementation of a first debug event according to the first language, and wherein the active debugging environment coordinates implementation of a second debug event according to the second language.

18. A computer-readable medium storing instructions for performing a method of facilitating the debugging of aggregate code that automates one or more scriptable objects provided through a host, the method comprising:

providing an active debugging environment for interacting with a host that provides one or more scriptable objects capable of automation by an aggregate code that includes a first code fragment written in a first language and a second code fragment written in a second language;

recognizing a debuggable entity created from the aggregate code and context information;

based upon plural debug events for the debuggable entity, intervening in automation, wherein the active debugging environment coordinates implementation of a first debug event according to the first language, wherein the active debugging environment coordinates implementation of a second debug event according to the second language, and wherein the intervening in automation comprises imposing the plural debug events on the debuggable entity after automation begins.

19. A computer-readable medium storing instructions for performing a method of facilitating the debugging of aggregate code that automates one or more scriptable objects provided through a host, the method comprising:

providing an active debugging environment for interacting with a host that provides one or more scriptable objects capable of automation by an aggregate code that includes a first code fragment written in a first language and a second code fragment written in a second language;

recognizing a debuggable entity created from the aggregate code and context information;

based upon plural debug events for the debuggable entity, intervening in automation, wherein the active debugging environment coordinates implementation of a first debug event according to the first language, wherein the active debugging environment coordinates implementation of a second debug event according to the second language, and wherein the intervening in automation comprises:

imposing the plural debug events on the debuggable entity before automation begins; and imposing one or more additional debug events on the debuggable entity after automation begins.

20. A computer-readable medium storing instructions for performing a method of facilitating the debugging of aggregate code that automates one or more scriptable objects provided through a host, the method comprising:

providing an active debugging environment for interacting with a host that provides one or more scriptable objects capable of automation by an aggregate code that includes a first code fragment written in a first language and a second code fragment written in a second language;

recognizing a debuggable entity created from the aggregate code and context information;

based upon plural debug events for the debuggable entity, intervening in automation, wherein the active debugging environment coordinates implementation of a first debug event according to the first language, and wherein the active debugging environment coordinates implementation of a second debug event according to the second language; and wherein one or more additional code fragments join the aggregate code during automation.

\* \* \* \* \*